(12) United States Patent
Chakravarty et al.

(10) Patent No.: US 11,512,794 B2
(45) Date of Patent: Nov. 29, 2022

(54) PRESSURE RELIEF VALVE AND USES THEREOF

(71) Applicants: Tanmoy C. Chakravarty, Houston, TX (US); Gopalakrishna Salvady, Manvel, TX (US); Anurag Sharma, Houston, TX (US); Stanunathan Venkatachalam, Sugar Land, TX (US)

(72) Inventors: Tanmoy C. Chakravarty, Houston, TX (US); Gopalakrishna Salvady, Manvel, TX (US); Anurag Sharma, Houston, TX (US); Stanunathan Venkatachalam, Sugar Land, TX (US)

( * ) Notice: Subject to any disclaimer, the term of this patent is extended or adjusted under 35 U.S.C. 154(b) by 0 days.

(21) Appl. No.: 17/706,036

(22) Filed: Mar. 28, 2022

(65) Prior Publication Data

US 2022/0307621 A1 Sep. 29, 2022

Related U.S. Application Data

(60) Provisional application No. 63/166,239, filed on Mar. 26, 2021.

(51) Int. Cl.
*F16K 17/02* (2006.01)
*F16K 31/122* (2006.01)
*F16K 27/02* (2006.01)

(52) U.S. Cl.
CPC .......... *F16K 31/1223* (2013.01); *F16K 17/02* (2013.01); *F16K 27/0209* (2013.01)

(58) Field of Classification Search
CPC .. F16K 17/0426; F16K 31/1223; F16K 17/02; F16K 27/02
See application file for complete search history.

(56) References Cited

U.S. PATENT DOCUMENTS

| | | | | |
|---|---|---|---|---|
| 4,210,174 A | * | 7/1980 | Eross | F16K 17/02 137/559 |
| 9,752,696 B2 | * | 9/2017 | Smith | F16K 17/02 |

* cited by examiner

*Primary Examiner* — P. Macade Nichols
(74) *Attorney, Agent, or Firm* — Law Office of Jeff Williams PLLC; J. Oliver Williams

(57) ABSTRACT

A pressure relief valve includes a valve body, a valve seat, a bonnet, and a valve actuator. The valve body has an open top, a bottom, a back and a front with a cavity formed within. A cap with a first vent is removably attached to the open top. An inlet opening and a discharge opening are in fluid communication with the cavity is formed at the bottom and front of the valve body respectively. The valve seat is circumferentially disposed around the inlet opening within the cavity. A recessed area is formed on a surface on the distal end of the valve seat that is configured to receive a lip seal. The bonnet has a closed top end with a second vent. The valve actuator is coupled within the bonnet to a set-pressure enabling means that is not a mechanical spring.

20 Claims, 11 Drawing Sheets

PRESSURE RELIEF VALVE AND USES THEREOF

CROSS REFERENCE TO RELATED APPLICATIONS

This application claims the benefit of an earlier filing date and right of priority to U.S. Provisional Application No. 63/166,239, filed 26 Mar. 2021, the contents of which is incorporated by reference herein in its entirety.

BACKGROUND OF THE INVENTION

1. Field of the Invention

The present invention is in the field of pressure relieving systems. More specifically, the present invention is directed to pressure relief valves for use in refineries, chemical plants and facilities that require protection from over pressurization.

2. Description of Related Art

Pressure relief valves (PRV) have a wide range of applications where pressure levels are critical to smooth operations such as oil and gas refineries, petrochemical plants, and power generation facilities that use steam, air, gas, or liquid. They are also used in multi-phase applications in refining and chemical processing systems.

Currently employed pressure relief valve technologies rely on a spring with a pre-tested spring constant to open the valve at a specific pressure setting, complemented with an air-tight metal-to-metal valve seat. Spring-loaded PRVs are reliable and versatile with many commercial applications. However, they are also fraught with many drawbacks. For example, the relieving pressure in spring-loaded PRVs is affected by the back pressure. Excessively high back pressure causes chattering, which leads to misalignments, damage to valve components including valve seat and eventually, mechanical failure. Spring-loaded PRVs also have a limited range of lift, which is the pressure at which the valve is fully open above the set pressure. Additionally, the spring metal is susceptible to unpredictable behavior due to hysteresis and fatigue.

Overall, there is a deficiency in the art for improved pressure relief valves that overcome the limitations imposed by springs. The present invention fulfills this longstanding need and desire in the art.

BRIEF SUMMARY OF THE INVENTION

The present invention is directed to a pressure relief valve. The valve comprises a valve body, a valve seat, a bonnet, and a valve actuator. The valve body has an open top, a bottom, a back and a front with a cavity formed within. A cap with a first vent is removably attached to the open top. An inlet opening in fluid communication with the cavity is formed at the bottom. A discharge opening in fluid communication with the cavity is formed on the front of the valve body. The valve seat is circumferentially disposed around the inlet opening within the cavity and comprises a distal end and a proximal end, which are provided with openings that are coaxially aligned with the inlet opening and in fluid communication with the cavity. A recessed area is formed on a surface on the distal end of the valve seat that is configured to receive a lip seal. The proximal end of the valve seat is disposed circumferentially and secured around an inner surface of the inlet opening. The bonnet is disposed in a coaxial relationship with the inlet opening and the valve seat and secured within the cavity to the valve body. The bonnet has a closed top end with a second vent that is coaxially aligned with the first vent and the inlet opening. The bonnet has an open bottom end that is disposed proximate to and in a non-contacting relationship with the distal end of the valve seat. The valve actuator is coupled within the bonnet to a set-pressure enabling means that is not a mechanical spring.

The present invention is also directed to a pressure operated relief valve comprising a valve body, a cap, a vented plug, a valve seat, a bonnet, a piston, a gas spring, and a guide plate. The valve body has a top with a service opening formed thereon, a bottom, a back and a front with a hollow chamber formed within. An inlet opening in fluid communication with the hollow chamber is formed at the bottom. A discharge opening in fluid communication with the hollow chamber is formed at the front of the valve body. The cap has a first vent and is removably attached over the service opening. The vented plug is removable secured to the first vent. The valve seat is circumferentially disposed around the inlet opening within the hollow chamber and comprises a distal end and a proximal end, which are provided with openings that are coaxially aligned with the inlet opening and in fluid communication with the hollow chamber. A recessed area is formed on a surface on the distal end of the valve seat that is configured to receive a lip seal. The proximal end of the valve seat is disposed circumferentially and secured around an inner surface of the inlet opening. The bonnet is disposed in a coaxial relationship with the inlet opening and the valve seat and secured within the hollow chamber to the valve body. The bonnet has a closed top end with a second vent that is coaxially aligned with the first vent and the inlet opening. The bonnet has an open bottom end that is disposed proximate to and in a non-contacting relationship with the distal end of the valve seat. The piston has a top surface, and a bottom surface with a structure complementary to the distal end of the valve seat whereby in a mutually abutted configuration, the bottom surface of the piston, and the distal end of the valve seat form an airtight seal. At least one recessed area is circumferentially formed around the side of the piston. A sealing ring is disposed within each of the at least one recessed area. The gas spring comprises a piston rod at a proximal end and an attachment means at a distal end. The piston rod is coaxially disposed with and removably secured to the piston on its top surface. The attachment means removably secures the distal end of the gas spring to the closed top end of the bonnet on an inner surface. The guide plate is disposed between the gas spring and the piston and is circumferentially secured around an inner surface of the bonnet. The guide plate comprises a coaxial guide opening that receives the piston rod therethrough. The diameter of the guide opening is sufficiently greater than an outer diameter of the piston rod for smooth movement of the piston in a vertical direction.

The present invention is further directed to, yet another pressure operated relief valve comprising a valve body, a cap, a vented plug, a valve seat, a bonnet, a piston, a spindle, and a guide plate. The valve body has a top with a service opening formed thereon, a bottom, a back and a front with a hollow chamber formed within. An inlet opening in fluid communication with the hollow chamber is formed at the bottom. A discharge opening in fluid communication with the hollow chamber is formed at the front. The cap has a first vent and is removably attached over the service opening. The vented plug is removable secured to the first vent. The valve seat is circumferentially disposed around the inlet opening within the hollow chamber and comprises a distal end and a proximal end, which are provided with openings that are coaxially aligned with the inlet opening and in fluid communication with the hollow chamber. A recessed area is formed on a surface on the distal end of the valve seat and is configured to receive a lip seal. The proximal end of the valve seat is disposed circumferentially and secured around an inner surface of the inlet opening. The bonnet is disposed in a coaxial relationship with the inlet opening and the valve seat and secured within the hollow chamber to the valve body. The bonnet has a closed top end with a second vent that is coaxially aligned with the first vent and the inlet opening. The bonnet has an open bottom end that is disposed proximate to and in a non-contacting relationship with the distal end of the valve seat. The piston has a top surface, and a bottom surface having a structure complementary to the distal end of the valve seat whereby in a mutually abutted configuration, the bottom surface of the piston, and the distal end of the valve seat form an airtight seal. At least one recessed area is circumferentially formed around the side of the piston. A sealing ring is disposed within each of the at least one recessed area. The spindle has a distal end, and a proximal end axially attached to the piston on its top surface. The guide plate is disposed circumferentially around an inner surface of the bonnet and attached thereon. The guide plate comprises a coaxial guide opening aligned with the spindle and the inlet opening. The diameter of the guide opening is sufficiently greater than an outer diameter of the spindle for smooth movement of the piston in a vertical direction.

Ultimately the invention may take many embodiments. In these ways, the present invention overcomes the disadvantages inherent in the prior art. The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. It is important, therefore, that the claims be regarded as including such equivalent constructions insofar as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
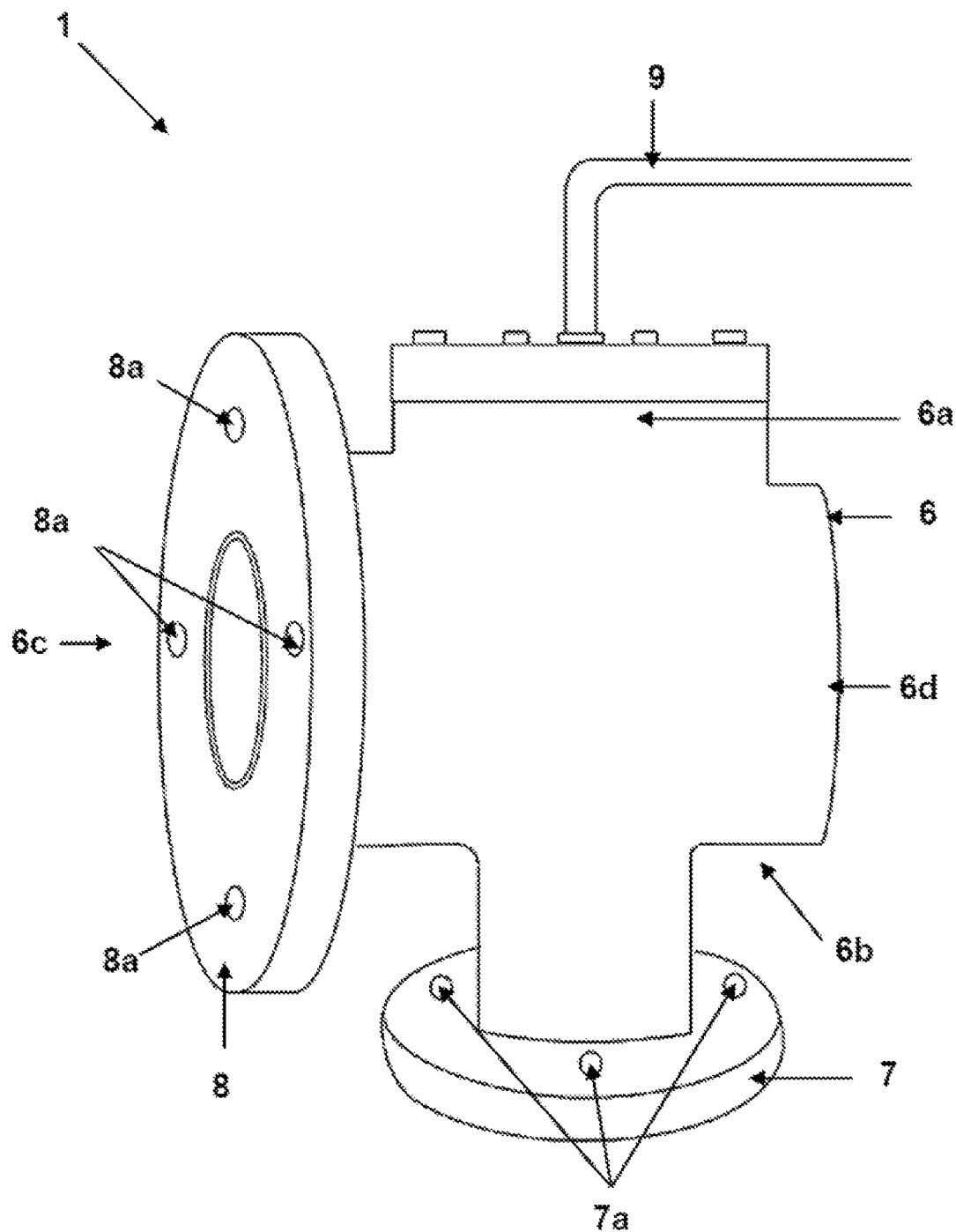
FIG. 1 is a side view of a first configuration of a pressure relief valve according to an embodiment of the present application.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE INVENTION

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The embodiments and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

For convenience, before further description of the present invention, certain terms employed in the specification, examples and appended claims are collected herein. These definitions should be read in light of the remainder of the disclosure and understood as by a person of skill in the art. Unless defined otherwise, all technical and scientific terms used herein have the same meaning as commonly understood by a person of ordinary skill in the art.

As used herein, the articles "a" and "an" when used in conjunction with the term "comprising" in the claims and/or the specification, may refer to "one", but it is also consistent with the meaning of "one or more", "at least one", and "one or more than one". Some embodiments of the invention may consist of or consist essentially of one or more elements, components, method steps, and/or methods of the invention. It is contemplated that any composition, component, or method described herein can be implemented with respect to any other composition, component or method described herein.

As used herein, the term "or" in the claims refers to "and/or" unless explicitly indicated to refer to alternatives only or the alternatives are mutually exclusive, although the disclosure supports a definition that refers to only alternatives and "and/or".

As used herein, the terms "comprise" and "comprising" are used in the inclusive, open sense, meaning that additional elements may be included. As used herein, the term "including" is used herein to mean "including, but not limited to". "Including" and "including but not limited to" are used interchangeably.

As used herein, the term "about" refers to a numeric value, including, for example, whole numbers, fractions, and percentages, whether or not explicitly indicated. The term "about" generally refers to a range of numerical values (e.g., ±5-15 10% of the recited value) that one of ordinary skill in the art would consider equivalent to the recited value (e.g., having the same function or result). In some instances, the term "about" may include numerical values that are rounded to the nearest significant figure. For example, a pressure of 13 psi to 330 psi is encompassed by about 15 psi to about 300 psi.

As used herein, the terms "top", "bottom", "front" and "back" as referenced in embodiments describing the valve body are used as a relative reference to their position on the valve body as viewed.

As used herein, the terms "proximal" and "distal" refers to elements disposed closer to the bottom and closer to the top respectively in the valve body.

As used herein, the terms "fluid" and "fluids" refer to gases, liquids, or a combination thereof, which are being processed in a system that requires protection by use of the pressure relief valve.

As used herein, the terms "pressure relief valve" and "pressure operated relief valve" are referenced interchangeably.

As used herein, the term "cracking pressure" is the minimum upstream fluid pressure required to open a valve sufficiently enough to enable detectable flow.

As used herein, the term "normal" with reference to pressure as in "normal operating conditions", "normal operation", "normal operating pressure", "normal operational pressure" and "normal pressure conditions" refers to the operationally safe conditions of pressure being exerted by the fluids being processed. The terms "normal operating pressure", "normal operational pressure" and "normal pressure conditions" refer to a pressure value under which a system is safely operable.

As used herein, the term "set pressure" is the pressure value at which the pressure relief valve is designed to sufficiently open to enable fluids to flow into the hollow chamber.

In one embodiment of the present invention, there is provided a pressure relief valve comprising a valve body with a cavity formed therewithin, an open top on which is removably attached a cap with a first vent formed thereon, a bottom with an inlet opening formed thereon, a back, and a front with a discharge opening formed thereon, said inlet opening and said discharge opening in fluid communication with the cavity; a valve seat disposed circumferentially around the inlet opening within the cavity, said valve seat comprising a distal end with a recessed area formed on a surface thereof, said recessed area configured to receive a lip seal therein; and a proximal end disposed circumferentially around an inner surface of the inlet opening and removably secured thereon; whereby the distal end, the proximal end and the inlet opening are coaxially aligned and in fluid communication with the cavity; a bonnet disposed coaxially with the inlet opening and the valve seat within the cavity and removably secured to the valve body, said bonnet comprising a closed top end with a second vent formed axially thereon, said second vent coaxially aligned with the first vent and the inlet opening; and an open bottom end disposed proximate to and in a non-contacting relationship with the valve seat; and a valve actuator coupled to a set pressure enabling means not comprising a mechanical spring disposed within the bonnet.

In this embodiment, the valve body encompasses a cavity within which is housed, the various elements comprising the valve. In one aspect, the cavity has a substantially uniform volume throughout within the valve body. In another aspect, the cavity has a volume at the front of the valve body that progressively decreases towards the back of the valve body.

In this embodiment, the valve body has an open top, a bottom, a front, and a back. The open top enables a user to access the valve components for servicing. During operation of the valve, the open top is closed with a cap that is removably secured to the valve body with any attachment means including, but not limited to screws, bolts, rivets, and clamps. A first vent coaxially aligned with the inlet opening is formed on the cap. The first vent provides the option for adding plumbing for attachment of an in-line pressurized inert gas source used to pressurize the bonnet thereby providing the counter pressure for the piston (discussed below) as desired in some embodiments of this invention.

In this embodiment, on the bottom of the valve body is formed an inlet opening that is in fluid communication with the cavity. The inlet opening provides a channel for entry of pressurized fluids during valve operation. In one aspect, a flanged inlet port is formed at the inlet opening on the outer surface of the valve body. The flanged inlet port enables removable attachment of the pressure relief valve to upstream plumbing for redirection of the pressured fluids and to provide relief during an elevated fluid pressure event. In a second aspect, the inlet opening is threaded for direct attachment to upstream plumbing.

In this embodiment, on the front of the valve body is formed a discharge (outlet) opening that is in fluid communication with the cavity. The discharge opening provides a channel for purging depressurized fluids out of the valve. In one aspect, a flanged discharge port is formed at the discharge opening on the outer surface of the valve body. The flanged discharge port enables removable attachment of the pressure relief valve to downstream plumbing fixtures. In a second aspect, the discharge opening is threaded for direct attachment to downstream plumbing.

Also in this embodiment, there is provided within the cavity, a valve seat that enables an airtight seal when the valve in closed during normal operating pressure. The valve seat comprises a distal end and a proximal end. On a surface of the distal end is formed a recessed area. The recessed area has a dimension that enables insertion of a lip seal that provides the airtight seal when abutted by a piston (see description of the valve actuator below). The proximal end of the valve seat is circumferentially disposed around an inner surface of the inlet opening and removably secured thereon. The valve seat is thus circumferentially disposed around the inlet opening and attached thereon by any suitable attachment means. For example, in one aspect, the proximal end of the valve seat is welded on an outer surface to an inner surface of the inlet opening. Alternatively, the proximal end of the valve seat is threaded on the outer surface to removably secure the valve seat to the inner surface of the inlet opening. Also in this embodiment, the distal end and the proximal end are provided with openings formed thereon whereby the distal end, the proximal end and the inlet opening are coaxially aligned and in fluid communication with the cavity.

Further in this embodiment, the bonnet is coaxially aligned with the inlet opening and the valve seat. The bonnet comprises a closed top end and an open bottom end and is removably secured to the valve body employing any suitable means including, but not limited to screws, bolts, pins, rivets, and clamps. For example, in one aspect, the bonnet is removably attached by its closed top end to an inner surface of the cap and secured thereon using screws.

In this embodiment, a second vent is formed on the closed top end of the bonnet. The second vent is coaxially aligned with the first vent in the cap. Additionally, in some embodiments of this invention, where an in-line counter pressure is desired over the piston (discussed below), a recessed area is formed on a top surface of the closed top end, circumferentially around the second vent. The recessed area enables insertion of a sealing ring to provide an airtight seal between the first vent and the second vent when the bonnet is secured to the valve body as described above.

Also, the open bottom end (bottom edge) of the bonnet is disposed circumferentially, proximate to the distal end of the valve seat and in a non-contacting relationship with the valve seat. This arrangement results in a fluid entry opening being formed between the distal end of the valve seat and the open bottom end of the bonnet, sufficiently large enough to permit entry of over pressurized fluids into the cavity of the pressure relief valve when the piston is pushed upwards to open the valve.

In this embodiment, the valve actuator comprises a piston, a spindle and a guide plate. The piston is disposed around the inner perimeter of the bonnet and comprises a top surface, a bottom surface and at least one side. The bottom surface of the piston has a three-dimensional structure that is complementary to that of the distal end of the valve seat. This feature ensures that when the distal end of the valve seat is abutted against the bottom surface of the piston during normal operating pressure, an airtight seal is formed thereby preventing the fluids from leaking into the cavity. Any suitable piston and complementary valve seat that provides a leak-free seal is custom manufactured or commercially purchased for this purpose.

Also in this embodiment, at least one recessed area is formed around the sides of the piston. The recessed area has a structure that enables insertion of a sealing ring. The sealing ring(s) enable smooth vertical movement of the piston within the bonnet and also enables formation of an airtight seal between the piston and the bonnet, whereby leakage of fluids into the bonnet is avoided. This is particularly important in specific embodiments of this invention where there is a requirement to pressurize the bonnet to a set pressure that is greater than normal operation pressure of the fluids as discussed below. In this embodiment, in one aspect, a single recessed area with a sealing ring is used. In a second aspect, two recessed areas, each with a sealing ring are used for an enhanced sealing feature that is particularly beneficial if one of the sealing rings fail during valve operation.

Also in this embodiment, the spindle has a distal end and a proximal end. The proximal end is removably secured to the piston axially on its top surface. Any suitable securing means including, but not limited to a screw, a split pin, a cotter pin, a lynch pin, a hitch pin, and a clevis pin is employed for this purpose.

Also, provided is a guide plate that is attached to the bonnet on an inner surface. The guide plate has a guide opening coaxially aligned with the spindle and the inlet opening. The diameter of the guide opening is sufficiently greater than an outer diameter of the spindle to ensure smooth and uniform movement of the piston in a vertical direction, within the bonnet. The guide plate is beneficial since it prevents misalignments between the bottom surface of the piston and the distal end of the valve seat during piston movement thereby avoiding leakage of fluids into the cavity of the pressure relief valve during normal operation.

Further in this embodiment, the valve actuator is coupled to the set pressure enabling means. The set pressure enabling means provides a sufficient counter pressure or equivalent thereof that is greater than the fluid pressure exerted during normal operation. This ensures that the valve is closed under normal operating conditions and opened only when the fluid pressure exceeds the set pressure.

In one aspect of this embodiment (Gas Spring Operated Pressure Relief Valve, GSOPRV), the set pressure enabling means is a gas spring disposed within the bonnet between the closed top end and the guide plate. Gas springs contain gas pressurized at a preset value, which provides sufficient counter pressure (set pressure) that is greater than or equal to the fluid pressure exerted during normal operation. This ensures that the valve is closed under normal operating conditions and opened only when the fluid pressure exceeds the set pressure. Gas springs are beneficial since the pressurized gas at a preset value obviates the need for an external pressurized gas source. Custom manufactured or commercially available gas springs is employed for this purpose. The gas spring has a piston rod at the proximal end that is secured to the distal end of the spindle. Alternatively, the spindle is removed, and the piston rod directly attached axially on the top surface of the piston. In either aspect, any suitable securing means including, but not limited to a screw, a split pin, a cotter pin, a lynch pin, a hitch pin and a clevis pin is employed for this purpose. Also, at the distal end of the gas spring is an attachment means including, but not limited to screws and bolts for securing the gas spring to the closed top end of the bonnet on an inner surface. Also in this embodiment, a vented plug is secured to the first vent to avoid dust from entering the interior of the bonnet.

In a second aspect of this embodiment (Pressure Operated Pressure Relief Valve, POPRV), the set pressure enabling means is an external pressurized gas source. In this embodiment, a plumbing is removably secured on a first end to the first vent on a top surface of the cap. The second end on the plumbing is connected to the pressurized gas source. The gas source ensures pressurization of the bonnet to a desired set pressure during normal operation. Also in this embodiment, a control valve including, but not limited to a needle valve is optionally installed between the first end of the plumbing and the first vent. The control valve enables adjustment of the set pressure during initial bonnet pressurization, and also enables disconnection of the external pressurized gas source after the bonnet is pressurized to the desired set pressure.

In either aspects, in this embodiment the gas within the gas spring and the pressurized gas source is any inert gas including, but not limited to nitrogen, helium and argon. In one aspect the inert gas is nitrogen.

In a third aspect of this embodiment (Magnetically Operated Pressure Relief Valve, MOPRV), the set pressure enabling means is a magnetic means in which the valve seat and the piston are manufactured using magnetic materials so that the piston is removably attachable to the valve seat by magnetic attractive forces. In this embodiment, the magnetic attractive forces enabled by the magnetic materials is proportional to the desired set pressure. Thus, when the fluid pressure exceeds the set pressure, the magnetic force can no longer ensure a seal between the valve seat and the piston. This results in lifting of the piston upwards inside the bonnet due to the excess fluid pressure. As a result, the fluid enters the cavity through the inlet opening and exits the cavity through the discharge opening, thereby relieving the excess pressure in the system. Once the fluid pressure returns to the set pressure value, the piston returns to its original position (abutting the distal end of the valve seat) and is held in place by the magnetic attractive forces until another high fluid pressure event occurs when the above process is repeated. One of ordinary skill in this art would be well aware of methods to discern the relationships between magnetic force, magnetic flux and the pressure needed to overcome the magnetic force. One of ordinary skill in this art would also be well aware of methods for manufacturing valve seats and pistons having magnetic properties such that the magnetic force is equal to the set pressure. The magnetic means described in this embodiment is advantageous because it operates on the principle that a magnetic field between the two magnets decays exponentially as the magnets are separated, thereby enabling a faster-acting pressure relief valve that does not require an increasing force to open the relief valve fully after the cracking pressure has been exceeded.

In this embodiment, the magnetic material used is inert to the fluids in the pressure relief valve application. In one aspect, a substantial portion of the valve seat and piston are manufactured using material having magnetic properties. In another aspect, at a minimum, the distal end of the valve seat and the bottom surface of the piston are manufactured using material having magnetic properties. In either aspect, the valve seat and piston are each independently manufactured from any suitable ferromagnetic, diamagnetic, or paramagnetic material including, but not limited to iron, nickel, cobalt, neodymium and alloys thereof. For example, the valve seat and the piston are independently manufactured from magnetic alloys including, but not limited to NdFeB and AlNiCo. Also in this embodiment, a vented plug is secured to the first vent to avoid dust from entering the interior of the bonnet.

In all of the embodiments described above, the various elements of the pressure relief valve including, but not limited to the valve body, the cap, the valve seat, the bonnet, the piston, the gas spring, and the guide plate are independently constructed from engineering materials that withstand a pressure from about 15 psi to about 300 psi. Examples of engineering materials include, but are not limited to, a metal, a metal alloy including a carbon steel, a stainless steel, a cast iron, an aluminum alloy, a titanium alloy, a ceramic, a polymer, and a polymer composite. A combination of these materials may also be employed.

In all of the embodiments described above, any commercially available industrial grade stationary seals (mechanical seals) including, but not limited to SLYDRING® and GLYD RING® are employed. Also, in all of the embodiments described above, industrial grade sealing rings and industrial grade lip seals are used. The seal, sealing ring and lip seal are manufactured from any material, including, but not limited to a polytetrafluoroethylene (PTFE), a nitrile, a neoprene, an ethylene propylene diene monomer (EPDM) rubber, a fluorocarbon, a silicone, a perfluoroelastomer, a metal (example, aluminum, copper, silver, nickel, steel, or stainless steel), a metal alloy and a composite. A combination of these materials may also be employed. One of ordinary skill in this art would be well aware of the chemical resistance and temperature tolerance properties of the seals, sealing rings and lip seals to make an appropriate choice based on the application.

In another embodiment of the present invention, there is provided a pressure operated relief valve comprising a valve body with a hollow chamber formed therewithin comprising a top with a service opening formed thereon, a bottom with an inlet opening formed thereon, a front with a discharge opening formed thereon and a back, said inlet opening and said discharge opening in fluid communication with the hollow chamber; a cap with a first vent formed thereon removably attached over the service opening on the top; a vented plug removable secured to the first vent; a valve seat disposed circumferentially around the inlet opening within the hollow chamber, said valve seat comprising a distal end with a recessed area formed on a surface thereof, said recessed area configured to receive a lip seal therein; and a proximal end disposed circumferentially around an inner surface of the inlet opening and removably secured thereon; said distal end and said proximal end provided with openings formed thereon whereby the distal end, the proximal end and the inlet opening are coaxially aligned and in fluid communication with the hollow chamber; a bonnet disposed coaxially with the inlet opening and the valve seat within the hollow chamber and removably secured to the valve body, said bonnet comprising a closed top end with a second vent formed axially thereon, said second vent coaxially aligned with the first vent and the inlet opening; and an open bottom end disposed proximate to and in a non-contacting relationship with the valve seat; and a piston comprising a top surface, and a bottom surface having a structure complementary to the distal end of the valve seat whereby in a mutually abutted configuration, the bottom surface of the piston, and the distal end of the valve seat form an airtight seal; and at least one recessed area circumferentially formed around the side of the piston, each of said recessed area configured to receive a sealing ring therein; a gas spring comprising a piston rod at a proximal end and an attachment means at a distal end, said piston rod disposed coaxial with and removably secured to the piston on the top surface, and said attachment means removably secured to the closed top end of the bonnet on an inner surface; and a guide plate disposed between the gas spring and the piston, and circumferentially secured around an inner surface of the bonnet, said guide plate comprising a guide opening coaxially disposed to receive the piston rod therethrough; said guide opening having a diameter sufficiently greater than an outer diameter of the piston rod for smooth movement of the piston in a vertical direction.

In this embodiment, the valve body encompasses a hollow chamber within which is housed, the various elements comprising the valve. In one aspect, the hollow chamber has a substantially uniform volume throughout within the valve body. In another aspect, the hollow chamber has a volume at the front of the valve body that progressively decreases towards the back of the valve body.

In this embodiment, the valve body has an open top with a service opening formed thereon, a bottom, a front and a back. The service opening enables a user to access the valve components during service. The service opening is closed with a cap that is removably secured to the valve body with any attachment means including, but not limited to screws, bolts, rivets, and clamps. A first vent coaxially aligned with the inlet opening is formed on the cap.

In this embodiment, on the bottom of the valve body is formed an inlet opening that is in fluid communication with the hollow chamber. The inlet opening provides a channel for entry of pressurized fluids during valve operation. In one aspect, a flanged inlet port is formed at the inlet opening on the outer surface of the valve body. The flanged inlet port enables removable attachment of the pressure relief valve to upstream plumbing for redirection of the pressured fluids and to provide relief during an elevated fluid pressure event. In a second aspect, the inlet opening is threaded for direct attachment to upstream plumbing.

In this embodiment, on the front of the valve body is formed a discharge (outlet) opening that is in fluid communication with the hollow chamber. The discharge opening provides a channel for purging depressurized fluids out of the valve. In one aspect, a flanged discharge port is formed at the discharge opening on the outer surface of the valve body. The flanged discharge port enables removable attachment of the pressure relief valve to downstream plumbing fixtures. In a second aspect, the discharge opening is threaded for direct attachment to downstream plumbing.

Also in this embodiment, there is provided within the hollow chamber, a valve seat that enables an airtight seal when the valve is closed during normal operating pressure. The valve seat comprises a distal end and a proximal end. On a surface of the distal end is formed a recessed area. The recessed area has a dimension that enables insertion of a lip seal that provides the airtight seal when abutted by a piston (see description of the valve actuator below). The proximal end of the valve seat is circumferentially disposed around an inner surface of the inlet opening and removably secured thereon. The valve seat is thus circumferentially disposed around the inlet opening and attached thereon by any suitable attachment means. For example, in one aspect, the proximal end of the valve seat is welded on an outer surface to an inner surface of the inlet opening. Alternatively, the proximal end of the valve seat is threaded on the outer surface to removably secure the valve seat to the inner surface of the inlet opening. Also in this embodiment, the distal end and the proximal end are provided with openings formed thereon whereby the distal end, the proximal end and the inlet opening are coaxially aligned and in fluid communication with the hollow chamber.

Further in this embodiment, the bonnet is coaxially aligned with the inlet opening and the valve seat. The bonnet comprises a closed top end and an open bottom end and is removably secured to the valve body employing any suitable means including, but not limited to screws, bolts, pins, rivets, and clamps. For example, in one aspect, the bonnet is removably attached by its closed top end to an inner surface of the cap and secured thereon using screws.

In this embodiment, a second vent is formed on the closed top end. The second vent is coaxially aligned with the first vent in the cap. Additionally, a recessed area is formed on a top surface of the closed top end, circumferentially around the second vent. The recessed area enables insertion of a sealing ring to provide an airtight seal between the first vent and the second vent when the bonnet is secured to the valve body as described above.

Also, the open bottom end (bottom edge) of the bonnet is disposed circumferentially, proximate to the distal end of the valve seat and in a non-contacting relationship with the valve seat. This arrangement results in a fluid entry opening being formed between the distal end of the valve seat and the open bottom end of the bonnet, sufficiently large enough to permit entry of over pressurized fluids into the hollow chamber of the pressure relief valve when the piston is pushed upwards to open the valve.

Also in this embodiment, the piston is disposed around the inner perimeter of the bonnet and comprises a top surface, a bottom surface and at least one side. The bottom surface of the piston has a three-dimensional structure that is complementary to that of the distal end of the valve seat. This feature ensures that when the distal end of the valve seat is abutted against the bottom surface of the piston during normal operational pressure from the fluids, an airtight seal is formed thereby preventing the fluids from leaking into the hollow chamber. Any suitable piston and complementary valve seat that provides a leak-free seal is custom manufactured or commercially purchased for this purpose.

Also in this embodiment, at least one recessed area is formed around the sides of the piston. The recessed area has a structure that enables insertion of a sealing ring. The sealing ring(s) enable smooth vertical movement of the piston within the bonnet and also enables formation of an airtight seal between the piston and the bonnet, whereby leakage of fluids into the bonnet is avoided. In this embodiment, in one aspect, a single recessed area with a sealing ring is used. In a second aspect, two recessed areas, each with a sealing ring are used for an enhanced sealing feature that is particularly beneficial if one of the sealing rings fail during valve operation.

Also in this embodiment, there is provided a gas spring disposed within the bonnet. Gas springs contain gas pressurized at a preset value, which provides sufficient counter pressure (set pressure) that is greater than or equal to the fluid pressure exerted during normal operation. This ensures that the valve is closed under normal operating conditions and opened only when the fluid pressure exceeds the set pressure. Gas springs are beneficial since the pressurized gas at a preset value obviates a need for an external pressurized gas source. In this embodiment, the gas within the gas spring is any inert gas including, but not limited to nitrogen, helium, and argon. In one aspect the inert gas is nitrogen. Custom manufactured or commercially available gas springs is employed for this purpose. The gas spring has a piston rod at the proximal end that is secured to the top surface of the piston. Any suitable securing means including, but not limited to a screw, a split pin, a cotter pin, a lynch pin, a hitch pin and a clevis pin is employed for this purpose. Also, at the distal end of the gas spring is an attachment means including, but not limited to screws and bolts for securing the gas spring to the closed top end of the bonnet on an inner surface. Also in this embodiment, a vented plug is secured to the first vent to avoid dust from entering the interior of the bonnet.

Also in this embodiment, there is a guide plate that is attached to the bonnet on an inner surface. The guide plate has a guide opening for the piston rod to pass through. The guide opening is coaxially aligned with the piston rod and the inlet opening and has a diameter sufficiently greater than an outer diameter of the piston rod, to ensure smooth and uniform movement of the piston in a vertical direction, within the bonnet. The guide plate is beneficial since it prevents misalignments between the bottom surface of the piston and the distal end of the valve seat during piston movement thereby avoiding leakage of fluids into the hollow chamber in the pressure relief valve during normal operation.

In all of the embodiments described above, the various elements of the pressure relief valve including, but not limited to the valve body, the cap, the valve seat, the bonnet, the piston, the gas spring, and the guide plate are independently constructed from engineering materials that withstand a pressure from about 15 psi to about 300 psi. Examples of engineering materials include, but are not limited to, a metal, a metal alloy including a carbon steel, a stainless steel, a cast iron, an aluminum alloy, a titanium alloy, a ceramic, a polymer, and a polymer composite. A combination of these materials may also be employed.

In all of the embodiments described above, any commercially available industrial grade stationary seals (mechanical seals) including, but not limited to SLYDRING® and GLYD RING® are employed. Also, in all of the embodiments described above, industrial grade sealing rings and industrial grade lip seals are used. The seal, sealing ring and lip seal are manufactured from any material, including, but not limited to a polytetrafluoroethylene (PTFE), a nitrile, a neoprene, an ethylene propylene diene monomer (EPDM) rubber, a fluorocarbon, a silicone, a perfluoroelastomer, a metal (example, aluminum, copper, silver, nickel, steel, or stainless steel), a metal alloy and a composite. A combination of these materials may also be employed. One of ordinary skill in this art would be well aware of the chemical resistance and temperature tolerance properties of the seals, sealing rings and lip seals to make an appropriate choice based on the application.

In yet another embodiment of the present invention, there is provided a pressure operated relief valve comprising a valve body with a hollow chamber formed therewithin comprising a top with a service opening formed thereon, a bottom with an inlet opening formed thereon, a front with a discharge opening formed thereon and a back, said inlet opening and said discharge opening in fluid communication with the hollow chamber; a cap with a first vent formed thereon removably attached over the service opening on the top; a vented plug removable secured to the first vent; a valve seat disposed circumferentially around the inlet opening within the hollow chamber, said valve seat comprising a distal end with a recessed area formed on a surface thereof, said recessed area configured to receive a lip seal therein; and a proximal end disposed circumferentially around an inner surface of the inlet opening and removably secured thereon; said distal end and said proximal end provided with openings formed hereon whereby the distal end, the proximal end and the inlet opening are coaxially aligned and in fluid communication with the hollow chamber; a bonnet disposed coaxially with the inlet opening within the hollow chamber and removably secured to the valve body, said bonnet comprising a closed top end with a second vent formed axially thereon, said second vent coaxially aligned with the first vent and the inlet opening; and an open bottom end disposed proximate to and in a non-contacting relationship with the valve seat; and a piston comprising a top surface, and a bottom surface having a structure complementary to the distal end of the valve seat whereby in a mutually abutted configuration, the bottom surface of the piston, and the distal end of the valve seat form an airtight seal; and at least one recessed area circumferentially formed around the side of the piston, each of said recessed area configured to receive a sealing ring therein; a spindle comprising a distal end, and a proximal end axially attached to the piston on the top surface; a guide plate attached circumferentially around an inner surface of the bonnet, said guide plate comprising a guide opening coaxially aligned with the spindle and the inlet opening, said guide opening having a diameter sufficiently greater than an outer diameter of the spindle for smooth movement of the piston in a vertical direction.

In this embodiment, the valve body encompasses a hollow chamber within which is housed, the various elements comprising the valve. In one aspect, the hollow chamber has a substantially uniform volume throughout within the valve body. In another aspect, the hollow chamber has a volume at the front of the valve body that progressively decreases towards the back of the valve body.

In this embodiment, the valve body has an open top with a service opening formed thereon, a bottom, a front, and a back. The service opening enables a user to access the valve components during service. The service opening is closed with a cap that is removably secured to the valve body with any attachment means including, but not limited to screws, bolts, rivets, and clamps. A first vent coaxially aligned with the inlet opening is formed on the cap.

In this embodiment, on the bottom of the valve body is formed an inlet opening that is in fluid communication with the hollow chamber. The inlet opening provides a channel for entry of pressurized fluids during valve operation. In one aspect, a flanged inlet port is formed at the inlet opening on the outer surface of the valve body. The flanged inlet port enables removable attachment of the pressure relief valve to upstream plumbing for redirection of the pressured fluids and to provide relief during an elevated fluid pressure event. In a second aspect, the inlet opening is threaded for direct attachment to upstream plumbing.

In this embodiment, on the front of the valve body is formed a discharge (outlet) opening that is in fluid communication with the hollow chamber. The discharge opening provides a channel for purging depressurized fluids out of the valve. In one aspect, a flanged discharge port is formed at the discharge opening on the outer surface of the valve body. The flanged discharge port enables removable attachment of the pressure relief valve to downstream plumbing fixtures. In a second aspect, the discharge opening is threaded for direct attachment to downstream plumbing.

Also in this embodiment, there is provided within the hollow chamber, a valve seat that enables an airtight seal when the valve in closed during normal operating pressure. The valve seat comprises a distal end and a proximal end. On a surface of the distal end is formed a recessed area. The recessed area has a dimension that enables insertion of a lip seal that provides the airtight seal when abutted by a piston (see description of the valve actuator below). The proximal end of the valve seat is circumferentially disposed around an inner surface of the inlet opening and removably secured thereon. The valve seat is thus circumferentially disposed around the inlet opening and attached thereon by any suitable attachment means. For example, in one aspect, the proximal end of the valve seat is welded on an outer surface to an inner surface of the inlet opening. Alternatively, the proximal end of the valve seat is threaded on the outer surface to removably secure the valve seat to the inner surface of the inlet opening. Also in this embodiment, the distal end and the proximal end are provided with openings formed thereon whereby the distal end, the proximal end and the inlet opening are coaxially aligned and in fluid communication with the hollow chamber.

Further in this embodiment, the bonnet is coaxially aligned with the inlet opening and the valve seat. The bonnet comprises a closed top end and an open bottom end and is removably secured to the valve body employing any suitable means including, but not limited to screws, bolts, pins, rivets and clamps. For example, in one aspect, the bonnet is removably attached by its closed top end to an inner surface of the cap and secured thereon using screws.

In this embodiment, a second vent is formed on the closed top end. The second vent is coaxially aligned with the first vent in the cap. Additionally, a recessed area is formed on a top surface of the closed top end, circumferentially around the second vent. The recessed area enables insertion of a sealing ring to provide an airtight seal between the first vent and the second vent when the bonnet is secured to the valve body as described above.

Also, the open bottom end (bottom edge) of the bonnet is disposed circumferentially, proximate to the distal end of the valve seat and in a non-contacting relationship with the valve seat. This arrangement results in a fluid entry opening being formed between the distal end of the valve seat and the open bottom end of the bonnet, sufficiently large enough to permit entry of over pressurized fluids into the hollow chamber of the pressure relief valve when the piston is pushed upwards to open the valve.

Also in this embodiment, the piston is disposed around the inner perimeter of the bonnet and comprises a top surface, a bottom surface and at least one side. The bottom surface of the piston has a three-dimensional structure that is complementary to that of the distal end of the valve seat. This feature ensures that when the distal end of the valve seat is abutted against the bottom surface of the piston during normal operational pressure from the fluids, an airtight seal is formed thereby preventing the fluids from leaking into the hollow chamber. Any suitable piston and complementary valve seat that provides a leak-free seal is custom manufactured or commercially purchased for this purpose.

Also in this embodiment, at least one recessed area is formed around the sides of the piston. The recessed area has a structure that enables insertion of a sealing ring. The sealing ring(s) enable smooth vertical movement of the piston within the bonnet and also enables formation of an airtight seal between the piston and the bonnet, whereby leakage of fluids into the bonnet is avoided. In this embodiment, in one aspect, a single sealing ring is used. In a second aspect, two recessed areas, each with a sealing ring are used for an enhanced sealing feature that is particularly beneficial if one of the sealing rings fail during valve operation.

Further in this embodiment, the pressure operated relief valve comprises a magnetic set pressure enabling means. In this embodiment, the valve seat and the piston are manufactured using magnetic materials so that the piston is removably attachable to the valve seat by magnetic attractive forces. In this embodiment, the magnetic attractive forces enabled by the magnetic materials is proportional to the desired set pressure. Thus, when the fluid pressure exceeds the set pressure, the magnetic force can no longer ensure a seal between the valve seat and the piston. This results in lifting of the piston upwards inside the bonnet due to the excess fluid pressure. As a result, the fluid enters the hollow chamber through the inlet opening and exits the hollow chamber through the discharge opening, thereby relieving the excess pressure in the system. Once the fluid pressure returns to the set pressure value, the piston returns to its original position (abutting the distal end of the valve seat) and is held in place by the magnetic attractive forces until another high fluid pressure event occurs when the above process is repeated. One of ordinary skill in this art would be well aware of methods to discern the relationships between magnetic force, magnetic flux and the pressure needed to overcome the magnetic force. One of ordinary skill in this art would also be well aware of methods for manufacturing valve seats and pistons having magnetic properties such that the magnetic force is equal to the set pressure. The magnetic means described in this embodiment is advantageous because it operates on the principle that a magnetic field between the two magnets decays exponentially as the magnets are separated, thereby enabling a faster-acting pressure relief valve that does not require an increasing force to open the relief valve fully after the cracking pressure has been exceeded.

Also in this embodiment, the magnetic material used is inert to the fluids in the pressure relief valve application. In one aspect, a substantial portion of the valve seat and piston are manufactured using material having magnetic properties. In another aspect, at a minimum, the distal end of the valve seat and the bottom surface of the piston are manufactured using material having magnetic properties. In either aspect, the valve seat and piston are each independently manufactured from any suitable ferromagnetic, diamagnetic, or paramagnetic material including, but not limited to iron, nickel, cobalt, neodymium and alloys thereof. For example, the valve seat and the piston are independently manufactured from magnetic alloys including, but not limited to NdFeB and AlNiCo. Also in this embodiment, a vented plug is secured to the first vent to avoid dust from entering the interior of the bonnet.

Further in this embodiment, the spindle has a distal end and a proximal end. The proximal end is removably secured to the piston axially on its top surface. Any suitable securing means including, but not limited to a screw, a split pin, a cotter pin, a lynch pin, a hitch pin, and a clevis pin is employed for this purpose.

Also in this embodiment, the spindle has a distal end and a proximal end. The proximal end is removably secured to the piston, axially on its top surface. Any suitable securing means including, but not limited to a screw, a split pin, a cotter pin, a lynch pin, a hitch pin and a clevis pin is employed for this purpose.

Also in this embodiment, there is provided is a guide plate that is attached to the bonnet on an inner surface. The guide plate is provided with a guide opening aligned coaxially with the spindle. The guide opening has a diameter sufficiently greater than an outer diameter of the spindle to ensure smooth and uniform movement of the piston in a vertical direction, within the bonnet. The guide plate is beneficial since it prevents misalignments between the bottom surface of the piston and the distal end of the valve seat during piston movement thereby avoiding leakage of fluids into the hollow chamber in the pressure relief valve during normal operation.

In all of the embodiments described above, the various elements of the pressure relief valve including, but not limited to the valve body, the cap, the valve seat, the bonnet, the piston, and the guide plate are independently constructed from engineering materials that withstand a pressure from about 15 psi to about 300 psi. Examples of engineering materials include, but are not limited to, a metal, a metal alloy including a carbon steel, a stainless steel, a cast iron, an aluminum alloy, a titanium alloy, a ceramic, a polymer, and a polymer composite. A combination of these materials may also be employed.

In all of the embodiments described above, any commercially available industrial grade stationary seals (mechanical seals) including, but not limited to SLYDRING® and GLYD RING® are employed. Also, in all of the embodiments described above, industrial grade sealing rings and industrial grade lip seals are used. The seal, sealing ring and lip seal are manufactured from any material, including, but not limited to a polytetrafluoroethylene (PTFE), a nitrile, a neoprene, an ethylene propylene diene monomer (EPDM) rubber, a fluorocarbon, a silicone, a perfluoroelastomer, a metal (example, aluminum, copper, silver, nickel, steel, or stainless steel), a metal alloy and a composite. A combination of these materials may also be employed. One of ordinary skill in this art would be well aware of the chemical resistance and temperature tolerance properties of the seals, sealing rings and lip seals to make an appropriate choice based on the application.

Described herein is a pressure relief valve (PRV) that does not include a mechanical spring for set pressure sensing. The valve comprises a hollow chambered valve body within which are secured, a valve seat and a bonnet that houses a valve actuator coupled to a set pressure enabling means. The valve actuator comprises a piston, which abuts the valve seat to form an airtight seal when the operating pressure of the fluid being processed is less than or equal to the set pressure ("normal operating pressure conditions"). Any suitable valve seat and complementary piston that provides a leak-free seal is employed. A spindle attached to the piston and a guide plate, assisted by sealing rings enable smooth movement of the piston in the vertical direction within the bonnet during valve operation, without misalignments between the piston and the valve seat. This prevents leakage of fluids into the hollow chamber. Also described are three distinct embodiments for enabling the set pressure in the valve. One among these is a gas spring that is attached to the piston on a first end and the closed top end of the bonnet on the second end. The pressure of the gas within the gas spring is adjusted to a preset value (the "set pressure") greater than or equal to the normal operating pressure of the fluids. An alternative, second set pressure enabling means is through use of an external pressurized gas source that is attached to the pressure relief valve using suitable plumbing. The pressurized gas source is employed to pressurize the space above the piston within the bonnet to the set pressure. An yet another alternative third set pressure enabling means is made possible using a valve seat and piston manufactured using magnetic materials, so that the piston forms an airtight seal with the valve seat due to magnetic attractive forces. Here, the magnetic force is adjusted to be equal to the set pressure. When the fluid pressure exceeds normal operating conditions, the magnetic force can no longer engage the valve seat and the piston together, resulting in lifting of the piston by the excessive pressure to open the valve. Once the fluid pressure returns to a value equal or lower than the set pressure value (equivalent to set magnetic force), the piston returns to its original position to close the valve, and this process is repeated as needed.

Particularly, embodiments of the present invention are better illustrated with reference to the Figure(s), however, such reference is not meant to limit the present invention in any fashion. The embodiments and variations described in detail herein are to be interpreted by the appended claims and equivalents thereof.

Referring now to the Figures. FIG. 1 shows a first configuration 1 of the pressure relief valve. The pressure relief valve comprises a valve body 6 with a top 6a which is open, a bottom 6b, a front 6c and a back 6d that encompasses the various elements of the valve discussed below. A flanged inlet port 7 is formed on an outer surface of the valve body at the bottom which enables removable attachment of the pressure relief valve to an upstream plumbing (not shown) using anchor holes 7a. A flanged discharge port 8 is formed on an outer surface of the valve body on the front, which enables removable attachment of the pressure relief valve to downstream plumbing (not shown) using anchor holes 8a. Plumbing 9 enables attachment of an external pressurized gas source to the pressure relief valve.

Figure 2:
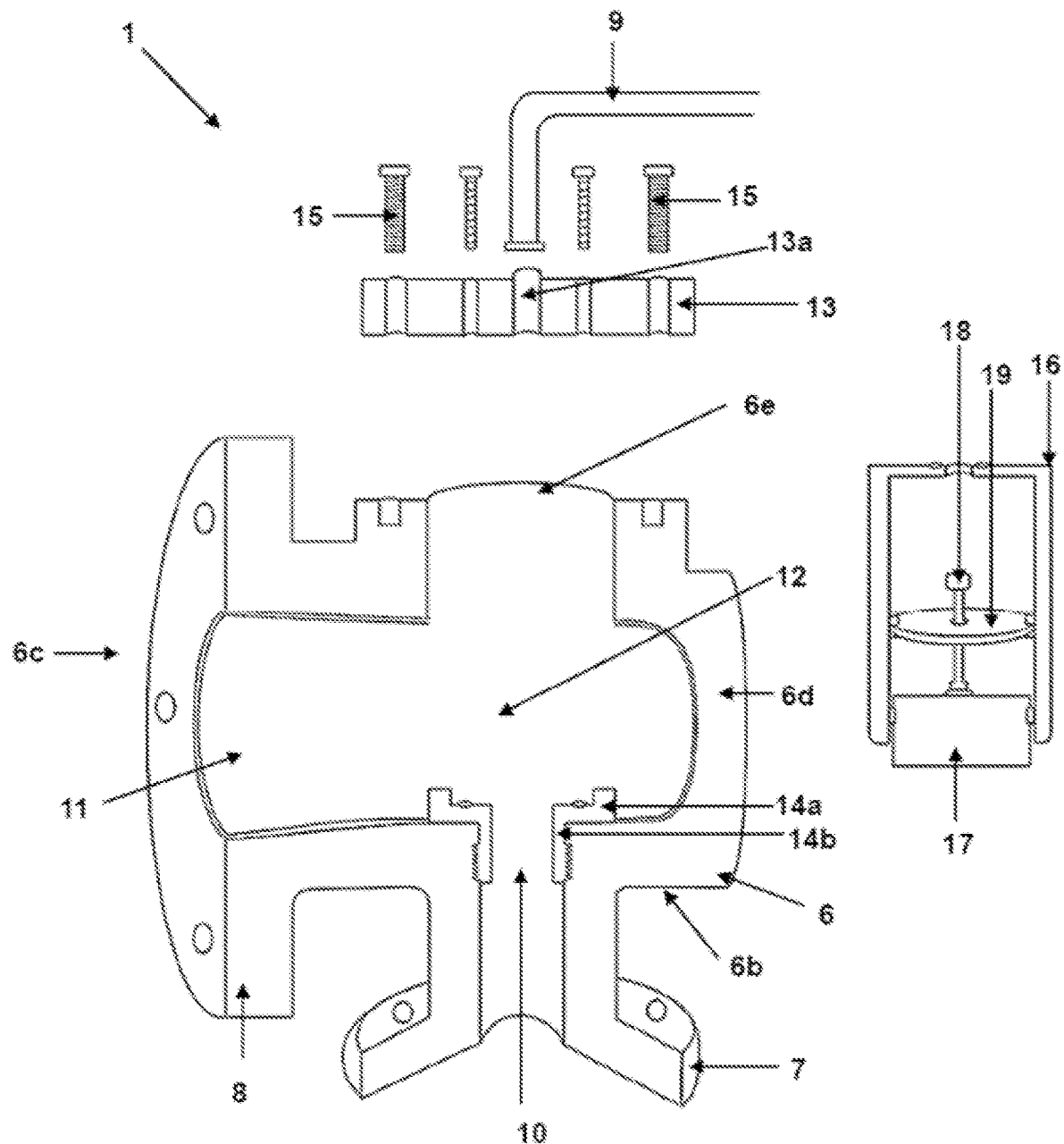
FIG. 2 is an exploded sectional side view of the pressure relief valve of FIG. 1.

FIG. 2 is an exploded sectional side view of the first configuration 1 of the pressure relief valve showing the valve body 6 bounded with an open top 6e, a bottom 6b, a front 6c and a back 6d encompassing a hollow chamber 12. The open top permits access to the hollow chamber and the valve components therein during servicing and is closed during operation with a cap 13 that is removably securable to the valve body with screws 15. A first vent 13a is axially formed on the cap for attachment of an external in-line pressurized gas source via plumbing 9. On the bottom of the valve body is formed an inlet opening 10 that is in fluid communication with the hollow chamber. The inlet opening provides a route for entry of over pressurized fluids when the valve is in an open state. At the front of the valve body is formed a discharge opening 11 that is also in fluid communication with the hollow chamber. When the valve is in an open state, the over pressurized fluids travel from the inlet opening to the hollow chamber to the discharge opening through which the fluids are purged out of the valve. A valve seat (14a, 14b) is circumferentially disposed and coaxially aligned with the inlet opening. A bonnet 16 is disposed within the hollow chamber. The bonnet houses the valve actuator comprising a piston 17, a spindle 18 attached to the piston and a guide plate 19.

Figure 3A:
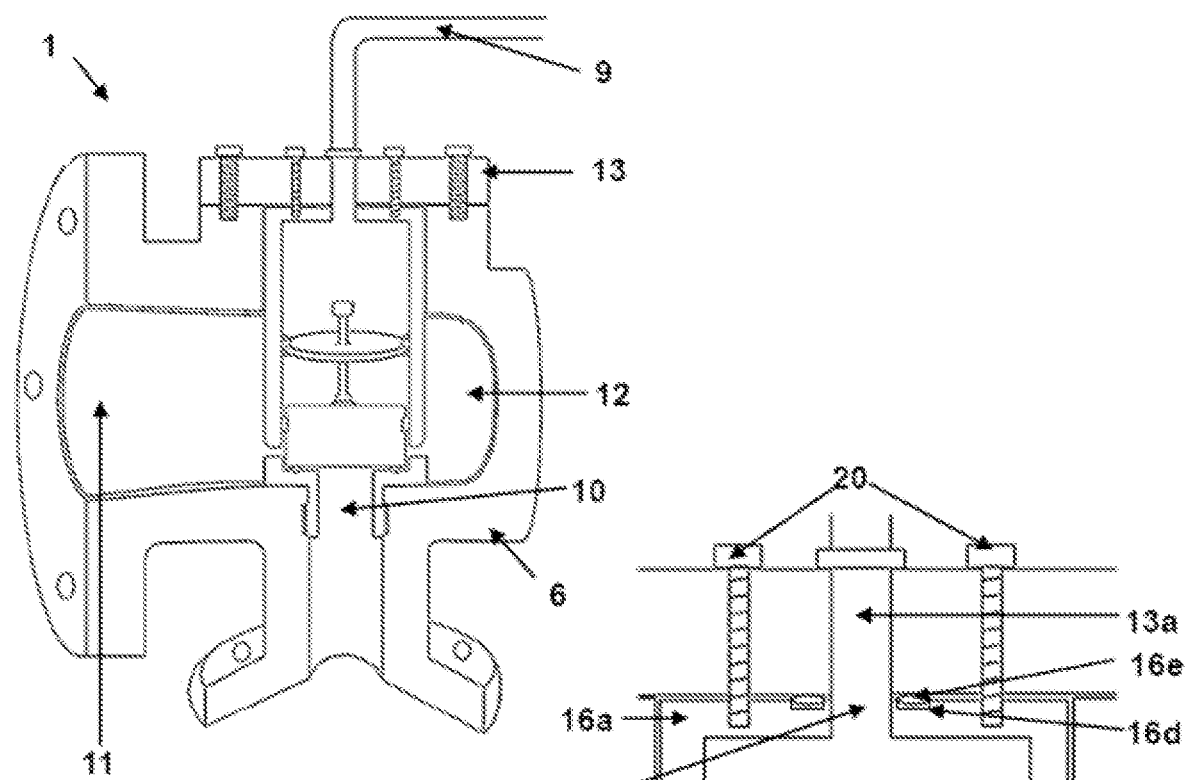
FIG. 3A is a sectional view of the first configuration of the pressure relief valve shown in FIG. 1 wherein the set pressure is enabled using a pressurized gas source.

With continued reference to FIG. 2, FIG. 3A is a sectional side view of the first configuration 1 of the pressure relief valve showing a valve body 6 within which is formed a hollow chamber 12. The open top of the valve body is closed with cap 13. The valve seat, the bonnet and the valve actuator are disposed within the hollow chamber in a coaxial relationship with the inlet opening and the first vent.

Figure 3B:
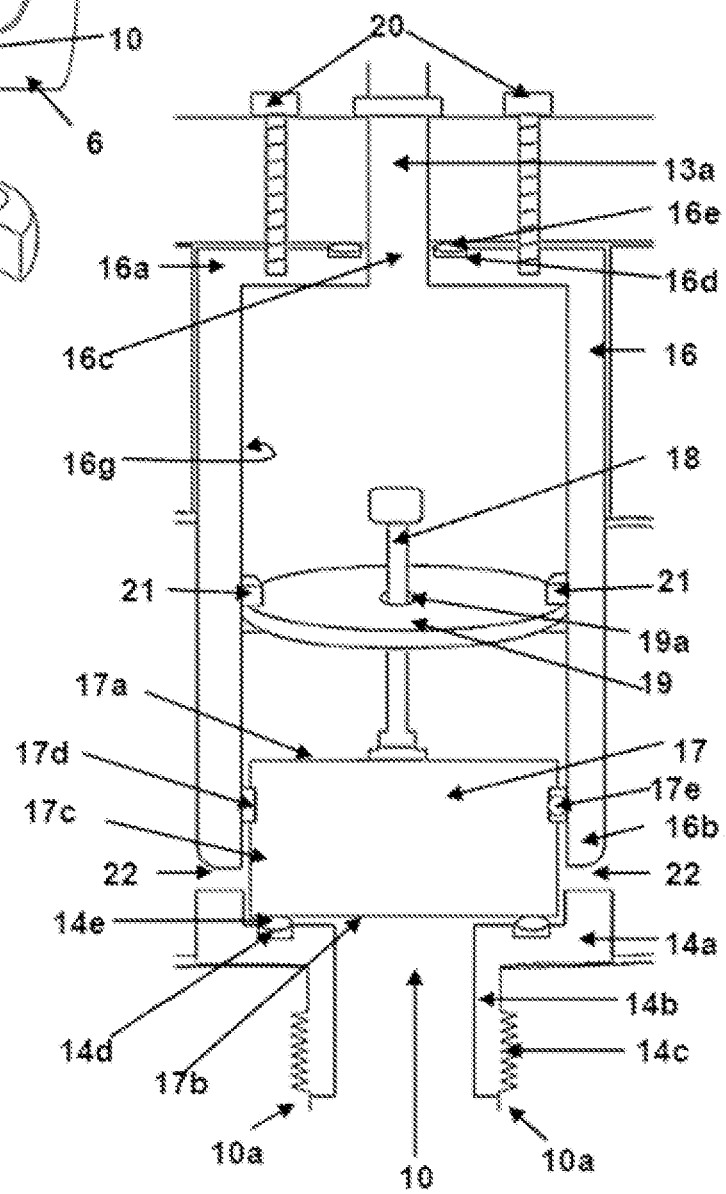
FIG. 3B is an enlarged section view of the pressure relief valve of FIG. 3A with the valve seat and the bonnet with the valve actuator.

With continued reference to FIGS. 2 and 3A, FIG. 3B is a magnified view showing the valve seat comprising a distal end 14a and a proximal end 14b circumferentially disposed around the inlet opening. The proximal end of the valve seat is threaded 14c on an outer surface, for removable attachment of the valve seat around an inner surface 10a of the inlet opening. On a surface of the distal end is formed a recessed area 14d into which is inserted a lip seal 14e. The lip seal is critical to operation of the pressure relief valve since it provides an airtight seal when abutted by piston 17. The valve actuator comprising piston 17, spindle 18 and guide plate 19 is housed within bonnet 16. The bonnet is coaxially aligned with the inlet opening and the valve seat and comprises a closed top end 16a and an open bottom end 16b. A second vent 16c coaxially aligned with the first vent in the cap is formed on the closed top end. Further, a recessed area 16d is formed on a top surface of the closed top end, circumferentially around the second vent. A sealing ring 16e inserted into the recessed space provides an airtight seal between the first vent and the second vent when the bonnet is secured to the cap using screws 20. The open bottom end of the bonnet 16b is disposed circumferentially around and proximate to and in a non-contacting relationship with the distal end of the valve seat. This arrangement results in a fluid entry opening 22 being formed between the valve seat and the open bottom end of the bonnet through which over pressurized fluids could enter the hollow chamber when the piston is pushed upwards to open the valve (discussed below). The piston 17 is disposed around the inner perimeter of the bonnet and comprises a top surface 17a, a bottom surface 17b and a side 17c. The bottom surface of the piston has a three-dimensional structure that is complementary to that of the distal end 14a of the valve seat. Thus, when the valve seat is abutted against the piston, an airtight seal is formed thereby preventing the fluids from leaking into the hollow chamber during normal operating pressure. Also, a recessed area 17d is formed around the side of the piston. to accommodate a sealing ring 17e. The sealing ring enables smooth vertical movement of the piston within the bonnet and also enables formation of an airtight seal between the piston and the bonnet. On the top surface of the piston is axially attached a spindle 18. The spindle has a diameter sufficiently smaller than a guide opening 19a formed on guide plate 19, so as to permit smooth and uniform movement of the piston in a vertical direction, within the bonnet. The guide plate is secured to clamps 21 attached on an inner surface 16g of the bonnet.

Figure 4A:
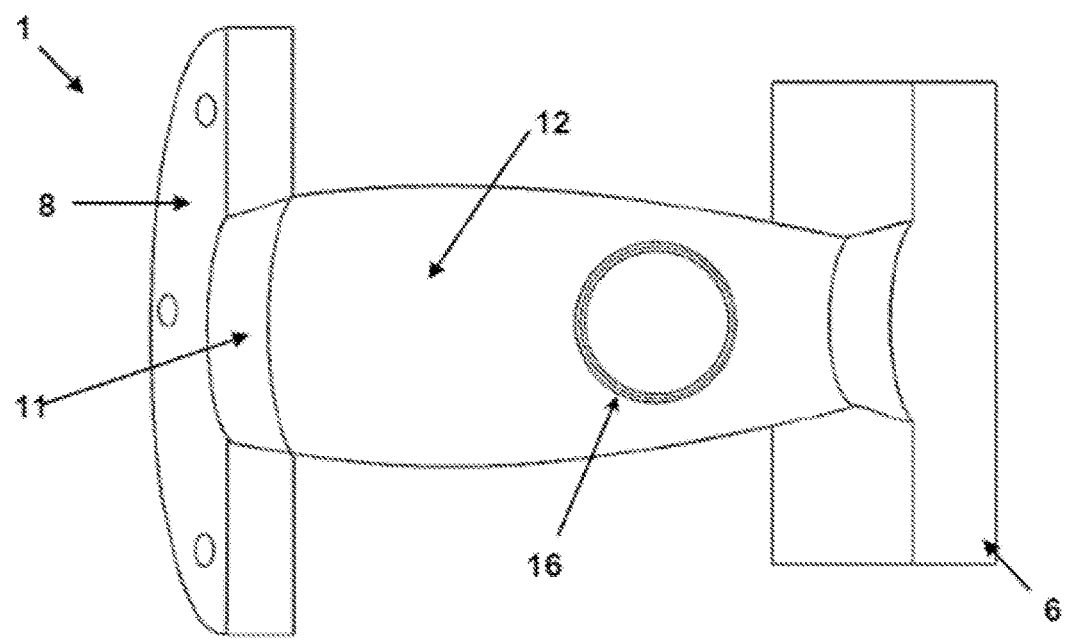
FIG. 4A is a top sectional view of the pressure relief valve of FIG. 1 showing the bonnet surrounded by the hollow chamber.

With continued reference to FIG. 3A, FIG. 4A is a sectional top view of the valve body 6 showing the bonnet 16 that is surrounded by the hollow chamber 12, which is in fluid communication with the discharge opening 11 and the discharge port 8.

Figure 4B:
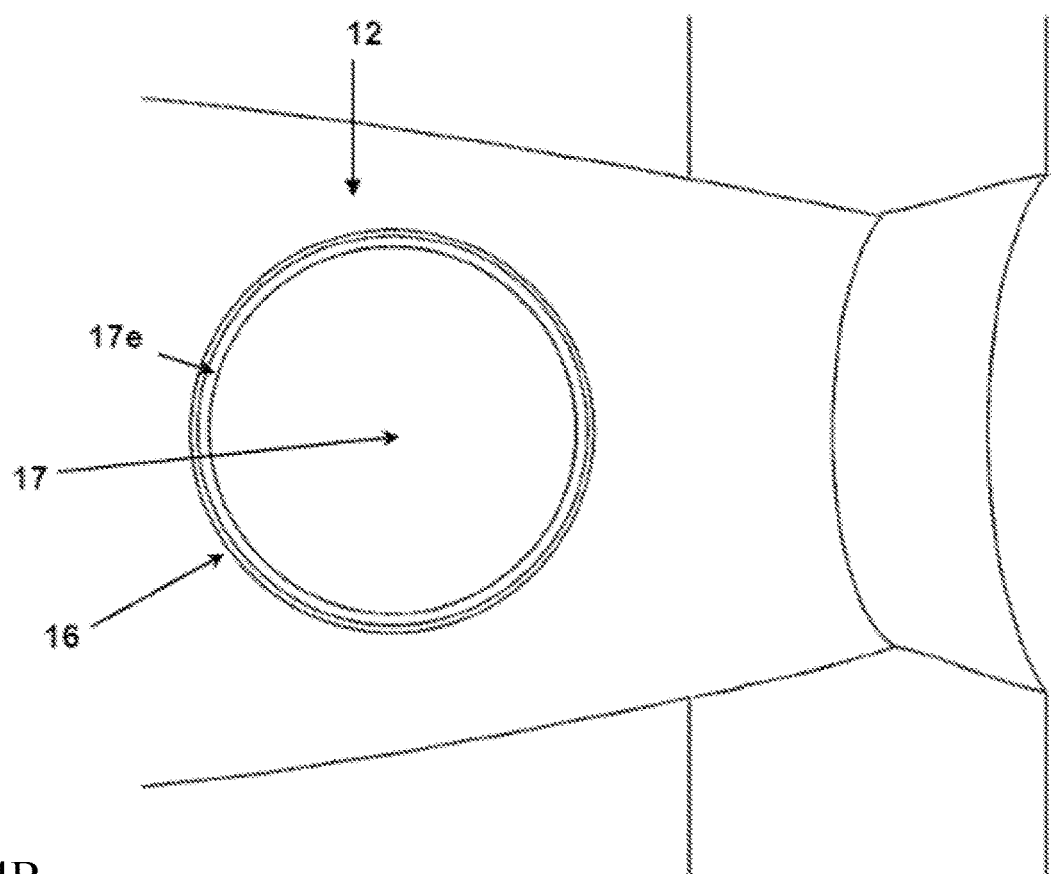
FIG. 4B is an enlarged view of FIG. 4A with the bonnet and the piston.

With continued reference to FIG. 4A, FIG. 4B is a magnified view showing the piston 17 with a sealing ring 17e around its circumference, disposed within bonnet 16.

Figure 5A:
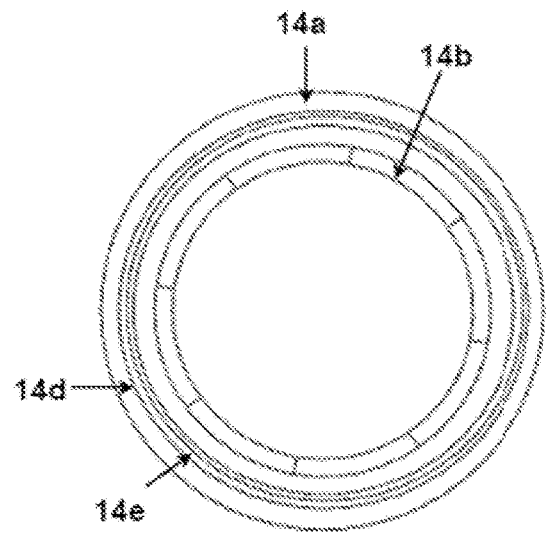
FIG. 5A is a top view of the valve seat in the pressure relief valve of FIG. 1.

With continued reference to FIG. 3A, FIG. 5A shows a top view of the valve seat which comprises distal end 14a and proximal end 14b. A recessed area 14d is formed 20 on a surface of the distal end into which is inserted a lip seal 14e.

Figure 5B:
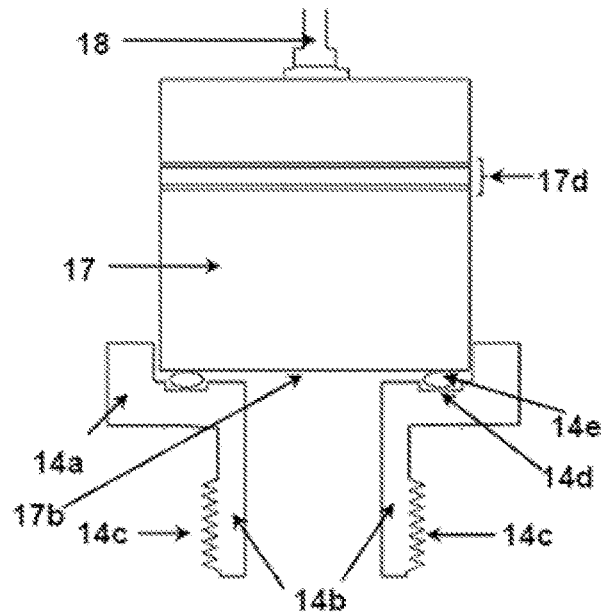
FIG. 5B is a side sectional view of the piston seated on the valve in the valve of FIG. 1.

With continued reference to FIG. 3B, FIG. 5B is a sectional side view of the piston 17 seated on the valve seat. A recessed area 17d is formed around the perimeter of the piston. A sealing ring (not shown) is placed inside the recessed area. The proximal end of the valve seat has an outer surface that is threaded 14c for securing the valve seat around the inlet opening. The distal end 14a of the valve seat is provided with a lip seal 14e, to ensure an airtight seal between bottom surface 17b of the piston and the distal end of the valve seat.

Figure 5C:
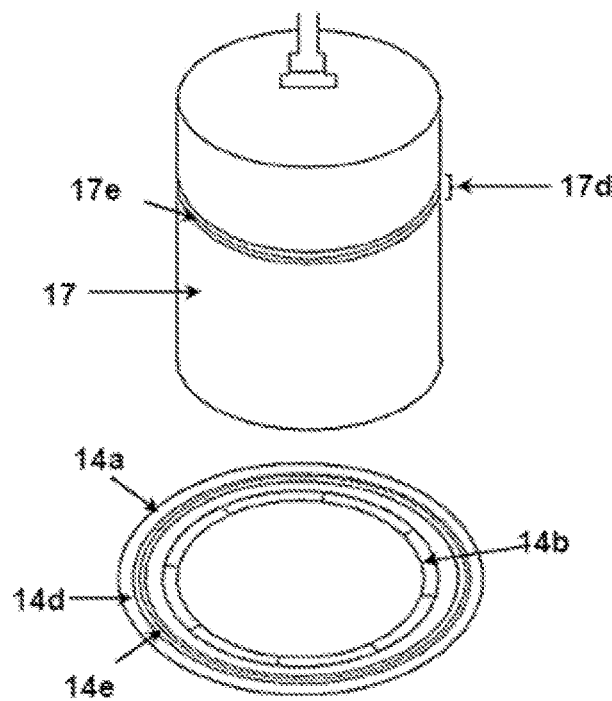
FIG. 5C is a front top view showing the piston lifted off the valve seat within the valve of FIG. 1.

With continued reference to FIG. 5A, FIG. 5C is a front, top to down view showing the piston 17 lifted off the valve seat.

Figure 5D:
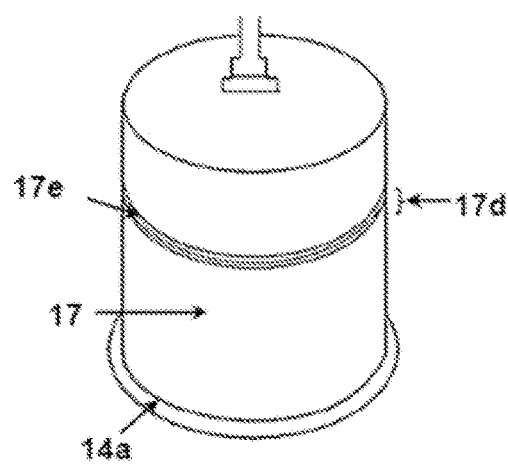
FIG. 5D is a front top view showing the piston seated on the valve seat of FIG. 5C.

With continued reference to FIG. 5C, FIG. 5D is a front, top to down view showing the piston seated on the valve seat.

Figure 6A:
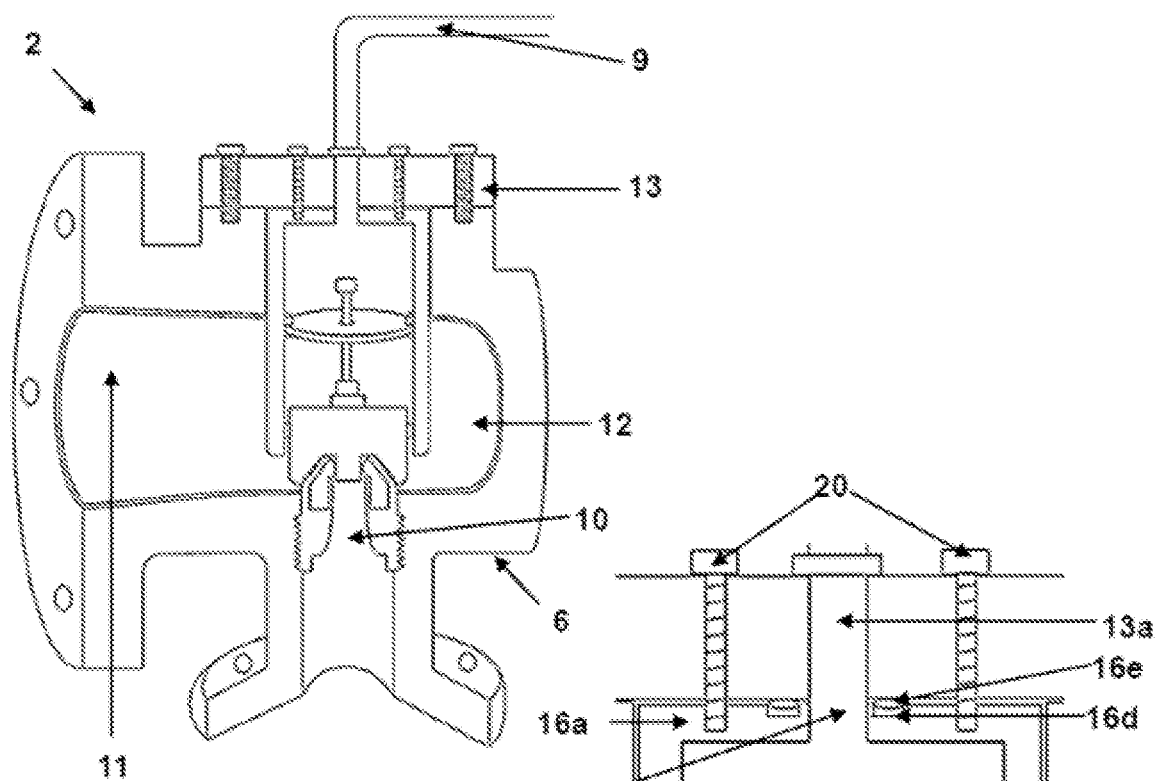
FIG. 6A is a sectional side view of a second embodiment of the pressure relief valve of FIG. 1.

With continued reference to FIG. 3A, FIG. 6A is a sectional side view of a second configuration 2 of the pressure relief valve as shown and described in FIG. 3A except for the valve seat and piston which are each replaced with a second embodiment.

Figure 6B:
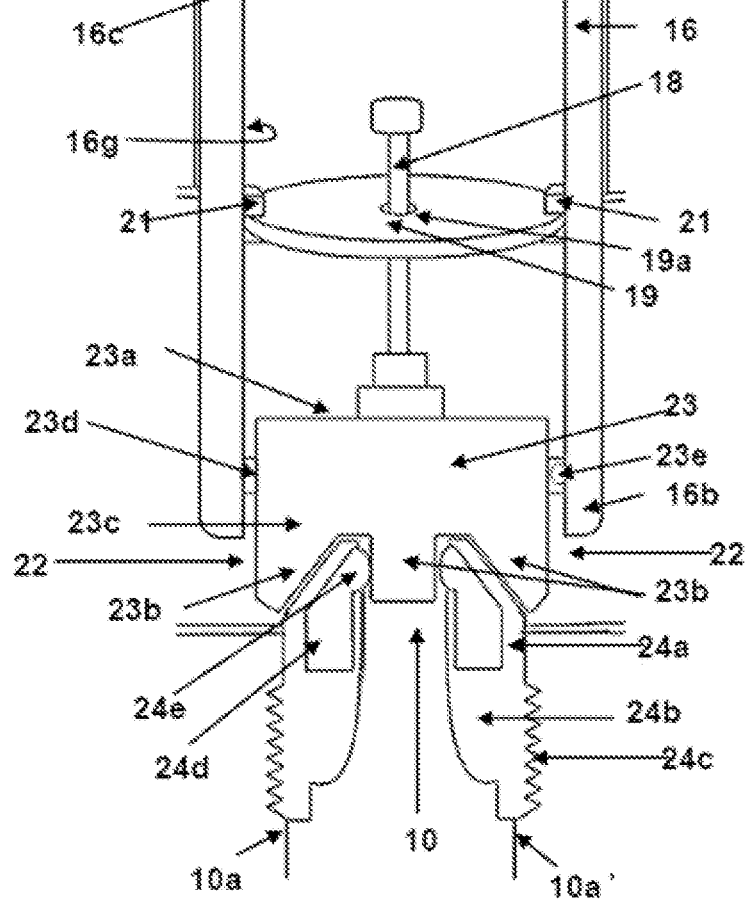
FIG. 6B is an enlarged view of the valve of FIG. 6A.

With continued reference to FIGS. 3B and 6A, FIG. 6B is a magnified view of the second configuration of the pressure relief valve as shown and described for FIG. 3B except for the valve seat and piston, replaced with the second embodiment. In this configuration, the valve seat comprises distal end 24a and a proximal end 24b circumferentially disposed around the inlet opening. An outer surface of the proximal end is threaded 24c, for removable attachment on an inner surface 10a of the inlet opening 10. On a surface at the distal end is formed a recessed area 24d into which is inserted a lip seal 24e. The lip seal enables formation of an airtight seal when the valve seat is abutted with piston 23. The piston is disposed around the inner perimeter of the bonnet and comprises a top surface 23a, a non-uniform bottom surface 23b that is complementary to the distal end 24a of the valve seat, and a side 23c. Thus, when this valve seat is abutted against the piston, an airtight seal is formed. Also, a recessed area 23d is circumferentially formed around the side of the piston to accommodate a sealing ring 23e. The sealing ring enables smooth vertical movement of the piston within the bonnet and also enables formation of an airtight seal between the piston and the bonnet.

Figure 7A:
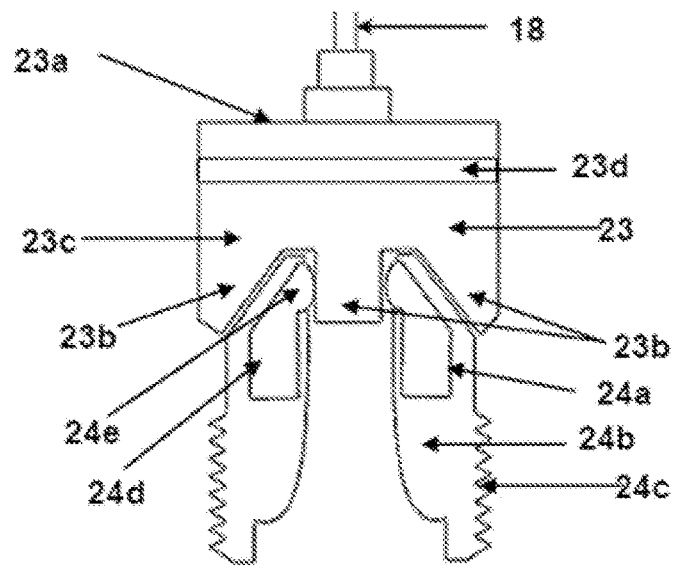
FIGS. 7A-7C are assorted views of a valve seat and piston in the valve of FIG. 6A.

With continued reference to FIG. 6B, FIG. 7A is a sectional side view of the piston 23 abutting the valve seat. The valve seat is secured around the inlet opening by the threaded 24c outer surface. Lip seal 24e inserted into recessed area 24d located on a surface on the distal end 24a of the valve seat ensures an airtight seal between the non-uniform bottom surface 23b of the piston and the distal end 24a of the valve seat.

Figure 7B:
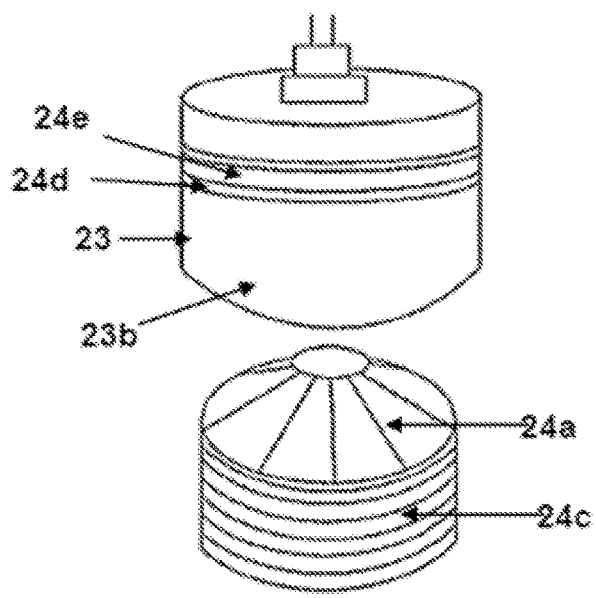
Figure 7C:
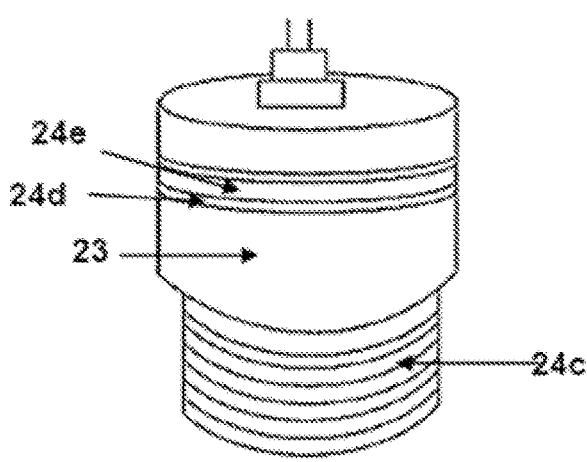

With continued reference to FIG. 7A, FIG. 7C is a front, top to down view showing the piston 23 lifted off the valve seat.

With continued reference to FIGS. 7A and 7B, FIG. 7C is a front, top to down view showing the piston seated 23 on the valve seat.

Figures 8A, 8B:
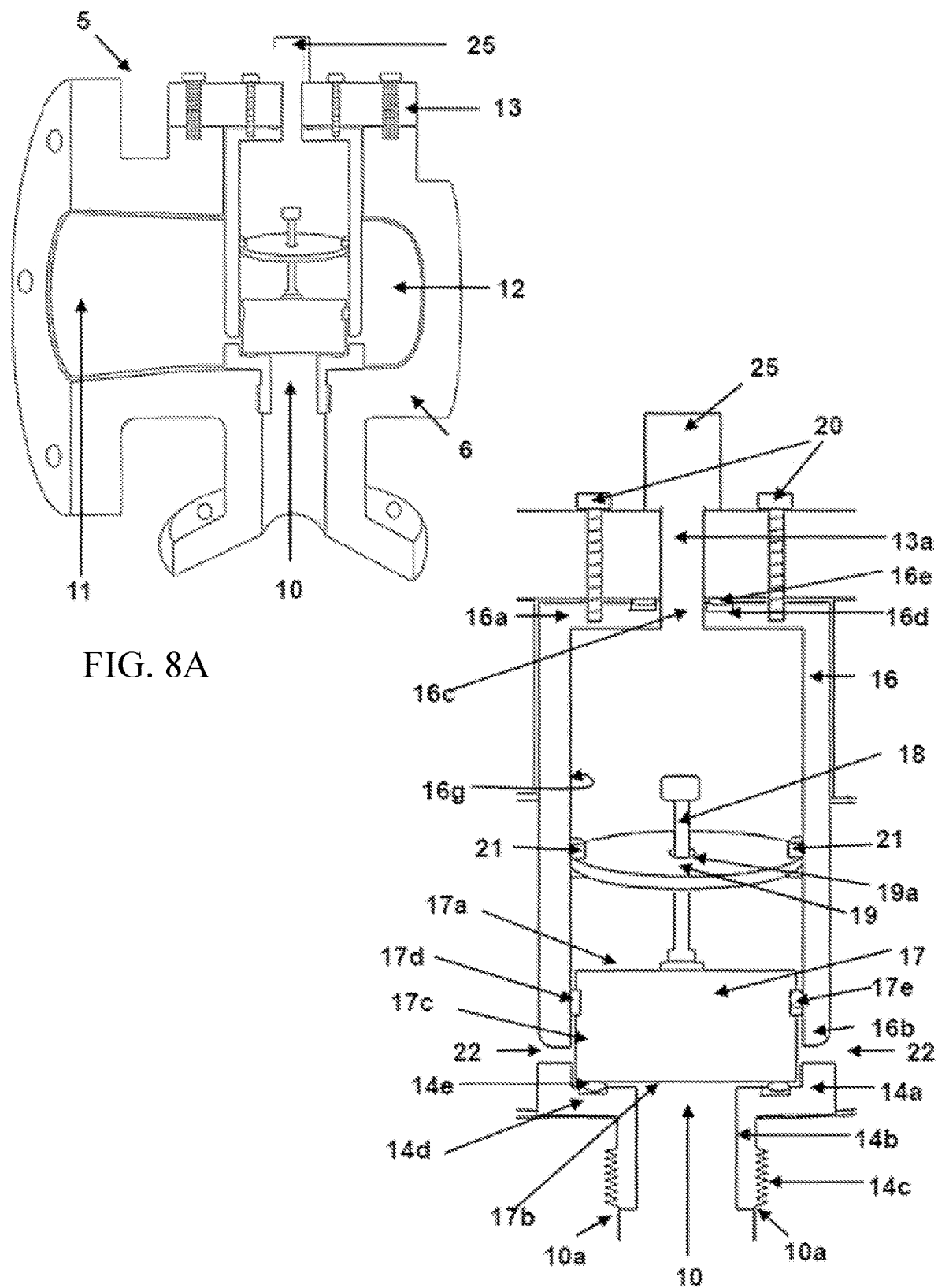
FIGS. 8A-8B show sectional views of a third configuration of the pressure relief valve shown in FIG. 1 in which the set pressure is enabled using magnetic elements.

With continued reference to FIG. 3A, FIG. 8A is a sectional side view of a fifth configuration of the pressure relief valve as shown and described in FIG. 3A, where the valve seat and piston are manufactured from a ferromagnetic material.

With continued reference to FIGS. 3B and 8A, FIG. 8B is a magnified view of the fifth configuration of the pressure relief valve as shown and described for FIG. 3B with the exception that the distal end 14a of the valve seat and the bottom surface 17b of the piston are manufactured from NdFeB a so that the piston is removably attachable to the valve seat by magnetic attractive forces.

Figure 9A:
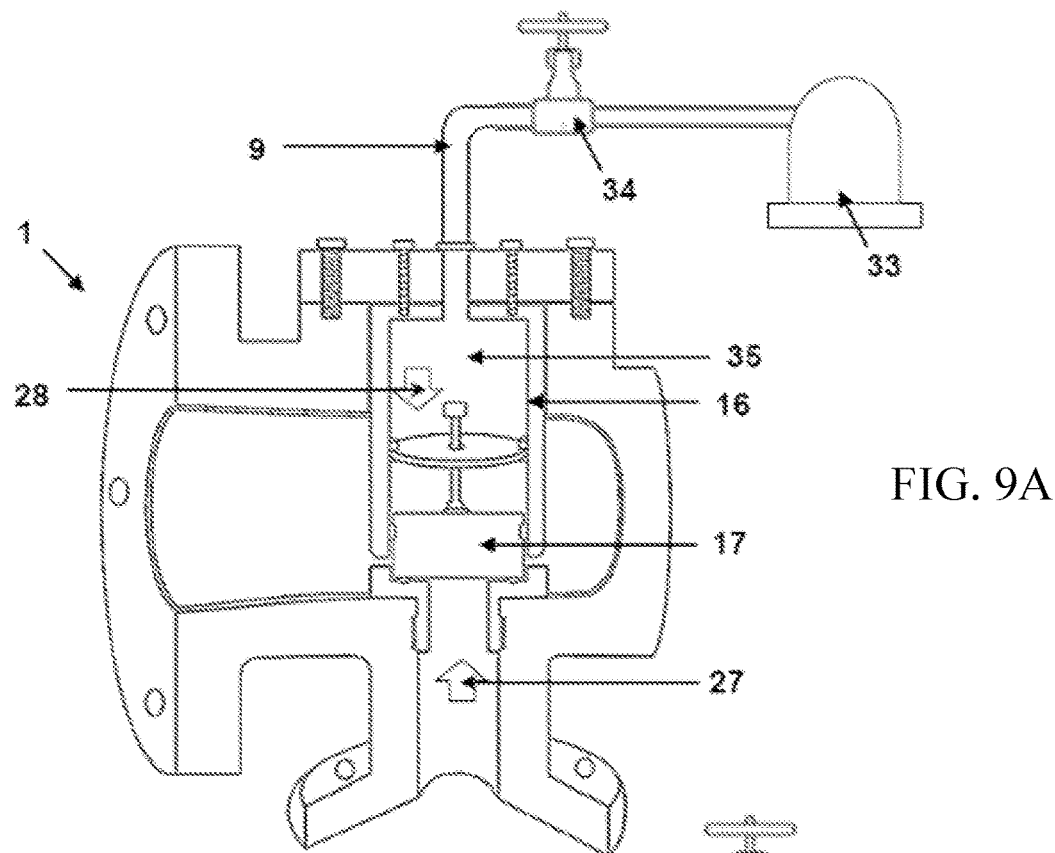
FIG. 9A is a side section view of valve of FIG. 1 shown in a "closed" state.

FIG. 9A shows the first configuration of the pressure relief valve in the "closed" state when the pressure 27 exerted by the fluids being processed is equal to or less than the set pressure 28 established over the piston from an external source of pressurized nitrogen gas 33 connected to plumbing 9. Needle valve 34 installed between the gas source and the plumbing enables pressurization of the space 35 above the piston 17 within the bonnet 16.

Figure 9B:
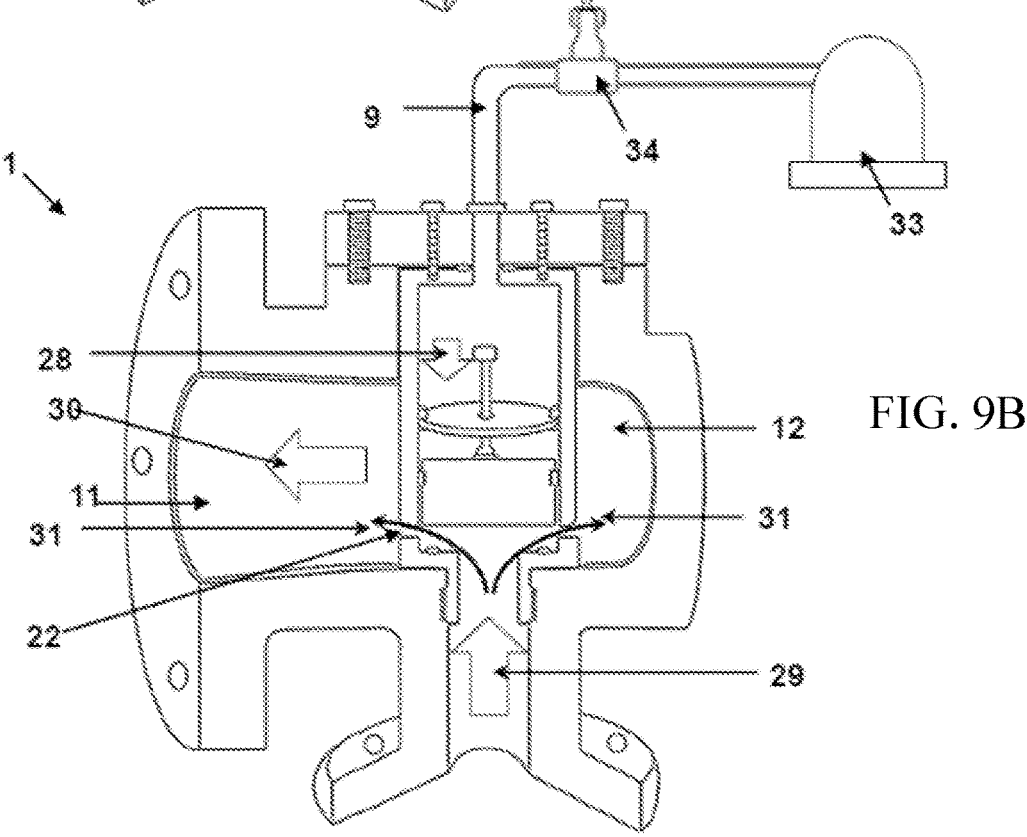
FIG. 9B is a side section view of valve of FIG. 1 shown in an "open" state.

With continued reference to FIG. 9A, FIG. 9B shows the pressure relief valve in the "open" state when pressure 29 exerted by the fluids being processed exceeds the set pressure 28 established over the piston. This results in the piston being pushed upwards into the bonnet leading to entry 31 of the fluids into the hollow chamber 12 via the fluid entry opening 22. The fluids travel through the hollow chamber and exit 30 via the discharge opening.

Figure 10A:
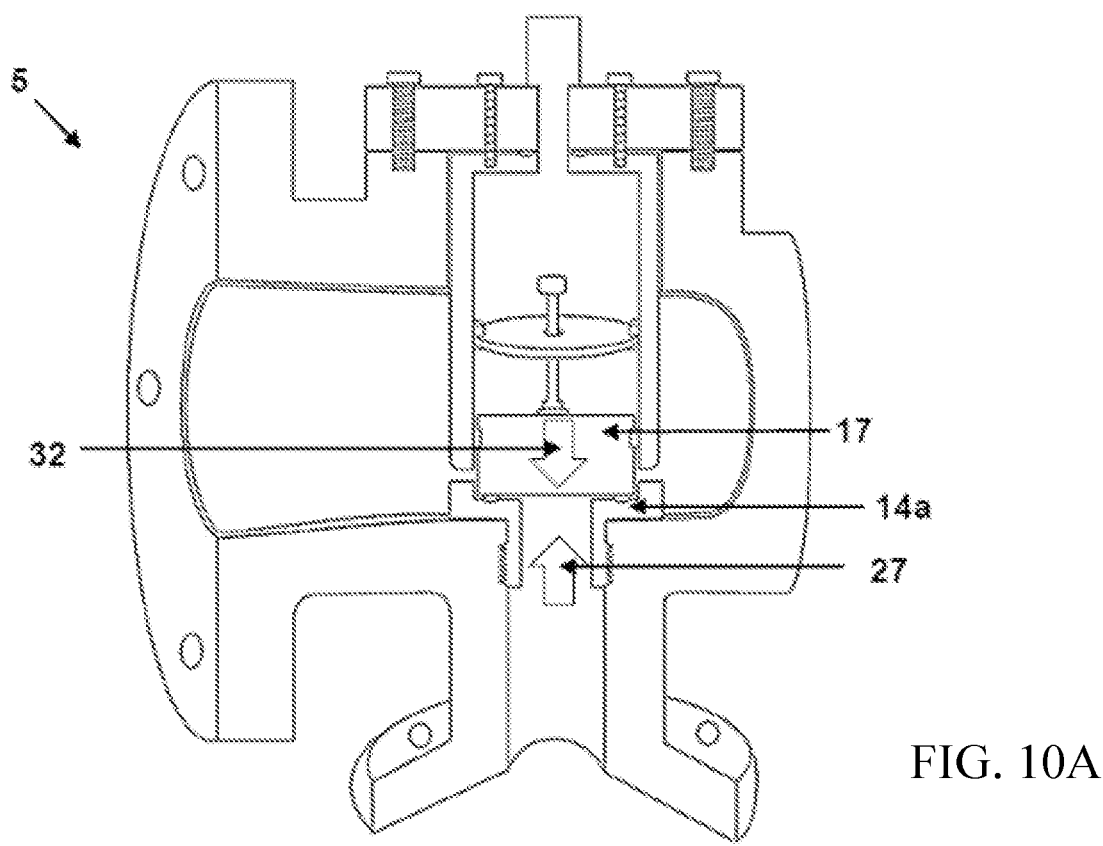
FIG. 10A is a side section view of valve of FIG. 8A-8B shown in a "closed" state.

FIG. 10A shows the fifth configuration of the pressure relief valve in the "closed" state when the pressure 27 exerted by the fluids being processed is equal or less than a pre-calibrated attractive magnetic force 32, equivalent to pressure 27 that attracts piston 17 to the distal end 14a of the valve seat.

Figure 10B:
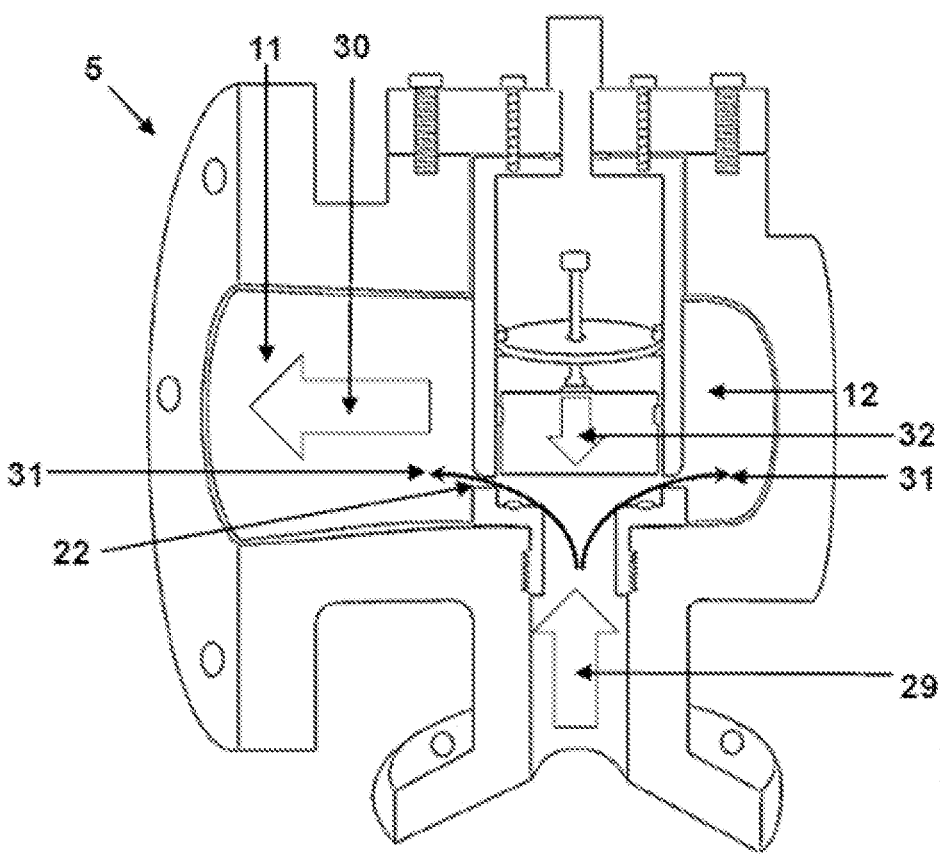
FIG. 10B is a side section view of valve of FIG. 8A-8B shown in an "open" state.
Figure 11:
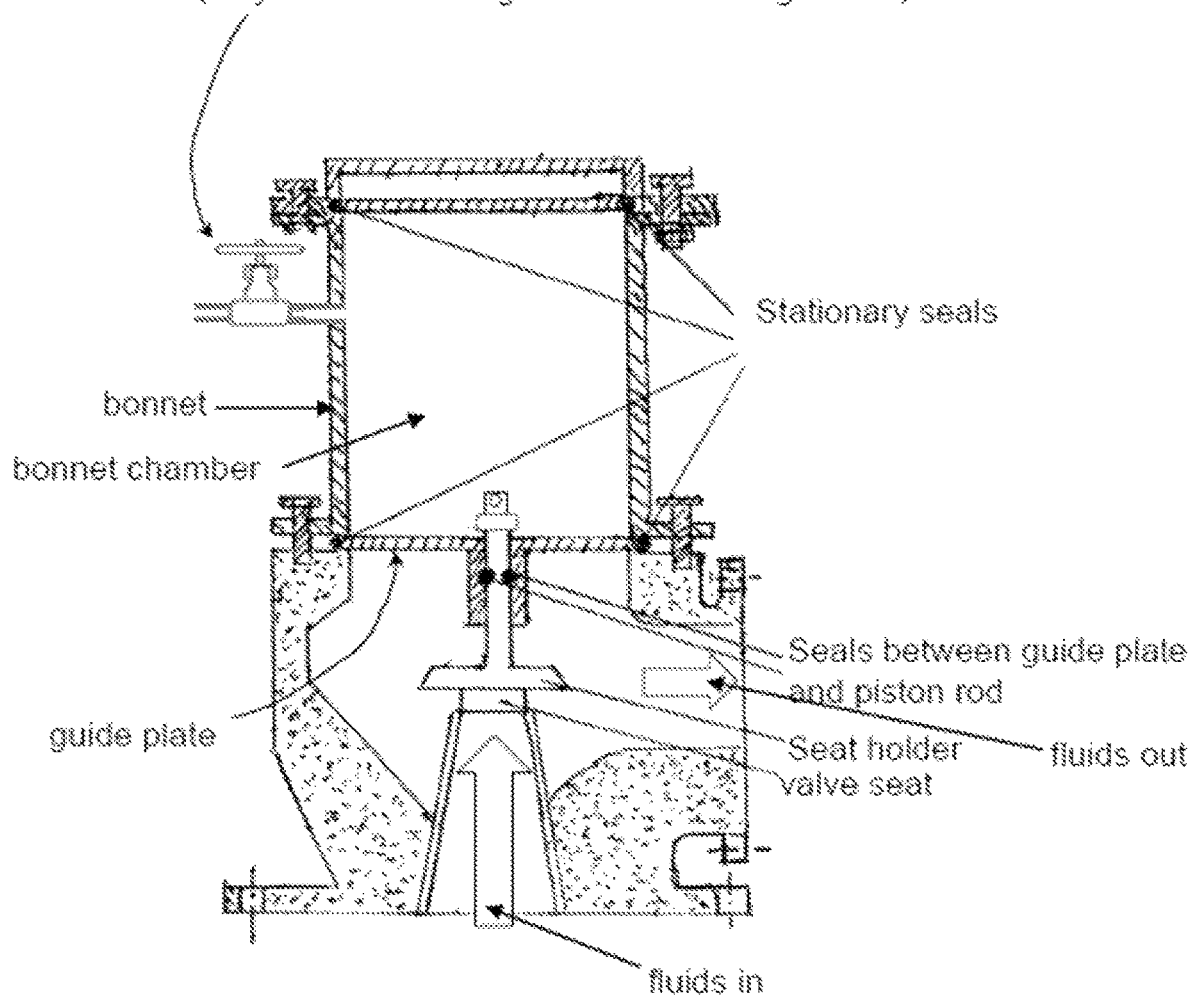
FIG. 11 is a side view of a fourth configuration of a pressure relief valve of FIGS. 1-10B wherein the body of which is attached to an external bonnet.

With continued reference to FIG. 10A, FIG. 10B shows the pressure relief valve in the "open" state when pressure 29 exerted by the fluids being processed exceed the magnetic force 32, equivalent to pressure 27. This results in the piston being pushed away from the valve seat upwards into the bonnet 17 leading to entry 31 of the fluids into the hollow chamber 12 via the fluid entry opening 22. The fluids travel through the hollow chamber and exit 30 via the discharge opening 11.

With continued reference to FIGS. 3A, 3B, 6A, 6B, and 8A-8B, FIG. 11 shows yet another configuration for a pressure relief valve. The bonnet in this configuration is used either as a sealed, pressured gas chamber to yield a POPRV, or is fitted with a gas spring to yield a GSOPRV. In either case, any commercially available industrial seals including SLYDRING® and GLYD RING® is employed for the stationary seals (mechanical seals) shown.

Further, by using piston and valve seat having magnetic properties, this configuration of the pressure relief valve is converted to a MOPRV. In this case the height of the bonnet is sufficiently reduced to enable upward movement of the piston rod during valve opening, thereby providing a more compact MOPRV design.

Overall, the pressure operated, the gas spring operated, and the magnetically operated pressure relief valves described in this invention have several benefits over the mechanical spring-operated pressure relief valve. These benefits include but are not limited to:

1) Reduced maintenance in corrosive environments.
2) Handle larger flow rates and larger range of pressure values.
3) A full-on/full-off snap action operation at the set pressure as opposed to modulated operation in conventional valves including mechanical spring-operated pressure relief valves.
4) Hysteresis and fatigue are non-existent due to absence of a mechanical spring.
5) Not affected by backpressure, therefore minimized chattering and misalignments, and hence a longer lasting valve life.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A pressure relief valve, comprising:
   a valve body with a cavity formed therewithin, an open top on which is removably attached a cap with a first vent formed thereon, a bottom with an inlet opening formed thereon, a back, and a front with a discharge opening formed thereon, said inlet opening and said discharge opening in fluid communication with the cavity;
   a valve seat disposed circumferentially around the inlet opening within the cavity, said valve seat comprising:
      a distal end with a recessed area formed on a surface thereof, said recessed area configured to receive a lip seal therein; and
      a proximal end disposed circumferentially around an inner surface of the inlet opening and removably secured thereon; said distal end and said proximal end provided with openings formed thereon whereby the distal end, the proximal end and the inlet opening are coaxially aligned and in fluid communication with the cavity;
   a bonnet disposed coaxially with the inlet opening and the valve seat within the cavity and removably secured to the valve body, said bonnet comprising:
      a closed top end with a second vent formed axially thereon, said second vent coaxially aligned with the first vent and the inlet opening; and
      an open bottom end disposed proximate to and in a non-contacting relationship with the distal end of the valve seat; and
   a valve actuator coupled to a set-pressure enabling means not comprising a mechanical spring disposed within the bonnet.

2. The pressure relief valve of claim 1, wherein the inlet opening, and the discharge opening are threaded for removable attachment to an upstream plumbing, and a downstream plumbing, respectively.

3. The pressure relief valve of claim 1, wherein the proximal end of the valve seat is threaded on an outer surface to removably secure the valve seat to the inner surface of the inlet opening.

4. The pressure relief valve of claim 1, wherein the closed top end of the bonnet is provided with a recessed area formed on a top surface circumferentially around the second vent, said recessed area configured to receive a sealing ring therein.

5. The pressure relief valve of claim 1, wherein the valve actuator comprises:
   a piston disposed around the inner perimeter of the bonnet comprising:
      a top surface, and a bottom surface having a structure complementary to the distal end of the valve seat whereby in a mutually abutted configuration, the bottom surface of the piston, and the distal end of the valve seat form an airtight seal; and
      at least one recessed area formed around the sides of the piston, each of said recessed area configured to receive a sealing ring therein;
   a spindle comprising a distal end, and a proximal end axially aligned and removably attached to the piston on the top surface; and
   a guide plate attached on an inner surface of the bonnet, said guide plate comprising a guide opening in coaxial alignment with the spindle and the inlet opening, said guide opening having a diameter sufficiently greater than an outer diameter of the spindle for smooth movement of the piston in a vertical direction.

6. The pressure relief valve of claim 1, wherein the set-pressure enabling means is a gas spring comprising:
   a piston rod at a proximal end that is removably attached to the distal end of the spindle;
   an attachment means at a distal end for removable attachment of the distal end to the closed top end of the bonnet on an inner surface; and
   a vented plug removable secured to the first vent.

7. The pressure relief valve of claim 1, wherein the set-pressure enabling means is a pressurized gas source comprising:
   a plumbing, with an optional control valve, removable secured on a first end to the first vent on the top surface of the cap; and
   wherein the pressurized gas source is removably secured on a second end of the plumbing.

8. The pressure relief valve of claim 1, wherein the set-pressure enabling means is a magnetic means comprising:
   at least the distal end of the valve seat manufactured from magnetic material;
   at least the bottom surface of the piston manufactured from magnetic material;
   whereby the piston is removably attachable to the valve seat by magnetic attraction; and
   a vented plug removable secured to the first vent.

9. The pressure relief valve of claim 1, wherein the valve body, the cap, the valve seat, the bonnet, the piston and the guide plate are independent constructed from a metal, a metal alloy, a polymer, or a polymer composite, or a combination thereof.

10. The pressure relief valve of claim 1, wherein the cavity has a volume that is substantially uniform.

11. The pressure relief valve of claim 1, wherein the cavity has a volume at the front of the valve body that is greater than a volume at the back of the valve body.

12. A pressure operated relief valve comprising:
   a valve body with a hollow chamber formed therewithin comprising a top with a service opening formed thereon, a bottom with an inlet opening formed thereon, a front with a discharge opening formed thereon and a back, said inlet opening and said discharge opening in fluid communication with the hollow chamber;
   a cap with a first vent formed thereon removably attached over the service opening on the top;
   a vented plug removable secured to the first vent;
   a valve seat disposed circumferentially around the inlet opening within the hollow chamber, said valve seat comprising:
      a distal end with a recessed area formed on a surface thereof, said recessed area configured to receive a lip seal therein; and
      a proximal end disposed circumferentially around an inner surface of the inlet opening and removably secured thereon; said distal end and said proximal end provided with openings formed thereon whereby the distal end, the proximal end and the inlet opening are coaxially aligned and in fluid communication with the hollow chamber;
   a bonnet disposed coaxially with the inlet opening and the valve seat within the hollow chamber and removably secured to the valve body, said bonnet comprising:
      a closed top end with a second vent formed axially thereon, said second vent coaxially aligned with the first vent and the inlet opening; and
      an open bottom end disposed proximate to and in a non-contacting relationship with the valve seat; and
   a piston comprising:
      a top surface, and a bottom surface having a structure complementary to the distal end of the valve seat whereby in a mutually abutted configuration, the bottom surface of the piston, and the distal end of the valve seat form an airtight seal; and
      at least one recessed area circumferentially formed around the side of the piston, each of said recessed area configured to receive a sealing ring therein;
   a gas spring comprising a piston rod at a proximal end and an attachment means at a distal end, said piston rod disposed coaxial with and removably secured to the piston on the top surface, and said attachment means removably secured to the closed top end of the bonnet on an inner surface; and
   a guide plate disposed between the gas spring and the piston, and circumferentially secured around an inner surface of the bonnet, said guide plate comprising a guide opening coaxially disposed to receive the piston rod therethrough, said guide opening having a diameter sufficiently greater than an outer diameter of the piston rod for smooth movement of the piston in a vertical direction.

13. The pressure operated relief valve of claim 12, wherein the inlet opening, and the discharge opening are threaded for removable attachment to an upstream plumbing, and a downstream plumbing, respectively.

14. The pressure operated relief valve of claim 12, wherein the proximal end of the valve seat is threaded on an outer surface to removably secure the valve seat to the inner surface of the inlet opening.

15. The pressure operated relief valve of claim 12, wherein the closed top end of the bonnet is provided with a recessed area formed on a top surface circumferentially around the second vent, said recessed area configured to receive a sealing ring therein.

16. A pressure operated relief valve comprising:
   a valve body with a hollow chamber formed therewithin comprising a top with a service opening formed thereon, a bottom with an inlet opening formed thereon, a front with a discharge opening formed thereon and a back, said inlet opening and said discharge opening in fluid communication with the hollow chamber;

a cap with a first vent formed thereon removably attached over the service opening on the top;

a vented plug removable secured to the first vent;

a valve seat disposed circumferentially around the inlet opening within the hollow chamber, said valve seat comprising:
- a distal end with a recessed area formed on a surface thereof, said recessed area configured to receive a lip seal therein; and
- a proximal end disposed circumferentially around an inner surface of the inlet opening and removably secured thereon; said distal end and said proximal end provided with openings formed thereon whereby the distal end, the proximal end and the inlet opening are coaxially aligned and in fluid communication with the hollow chamber;

a bonnet disposed coaxially with the inlet opening within the hollow chamber and removably secured to the valve body, said bonnet comprising:
- a closed top end with a second vent formed axially thereon, said second vent coaxially aligned with the first vent and the inlet opening; and
- an open bottom end disposed proximate to and in a non-contacting relationship with the valve seat; and a piston comprising:
- a top surface, and a bottom surface having a structure complementary to the distal end of the valve seat whereby in a mutually abutted configuration, the bottom surface of the piston, and the distal end of the valve seat form an airtight seal; and
- at least one recessed area circumferentially formed around the side of the piston, each of said recessed area configured to receive a sealing ring therein;

a spindle comprising a distal end, and a proximal end axially attached to the piston on the top surface;

a guide plate attached circumferentially around an inner surface of the bonnet, said guide plate comprising a guide opening coaxially aligned with the spindle and the inlet opening, said guide opening having a diameter sufficiently greater than an outer diameter of the spindle for smooth movement of the piston in a vertical direction.

17. The pressure operated relief valve of claim 16, wherein the inlet opening, and the discharge opening are threaded for removable attachment to an upstream plumbing, and a downstream plumbing, respectively.

18. The pressure operated relief valve of claim 16, wherein at least the distal end of the valve seat, and at least the bottom surface of the piston are made from magnetic material whereby the piston is removably attachable to the valve seat by magnetic attraction.

19. The pressure operated relief valve of claim 16, wherein the proximal end of the valve seat is threaded on an outer surface to removably secure the valve seat to the inner surface of the inlet opening.

20. The pressure operated relief valve of claim 16, wherein the closed top end of the bonnet is provided with a recessed area formed on a top surface circumferentially around the second vent, said recessed area configured to receive a sealing ring therein.

* * * * *